(12) United States Patent
Horii et al.

(10) Patent No.: US 7,463,827 B2
(45) Date of Patent: Dec. 9, 2008

(54) CAMERA SYSTEM

(75) Inventors: Hirofumi Horii, Asaka (JP); Kazunori Suemoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 371 days.

(21) Appl. No.: 11/295,560

(22) Filed: Dec. 7, 2005

(65) Prior Publication Data

US 2006/0133800 A1    Jun. 22, 2006

(30) Foreign Application Priority Data

Dec. 20, 2004   (JP)   ............................... 2004-368004
Dec. 20, 2004   (JP)   ............................... 2004-368009

(51) Int. Cl.
  *G03B 17/00*   (2006.01)
  *H04N 5/232*   (2006.01)

(52) U.S. Cl. ................................. 396/532; 348/211.14

(58) Field of Classification Search ................. 396/529, 396/530, 531, 532; 348/373, 360, 211.14, 348/221.1, 362
See application file for complete search history.

(56) References Cited

U.S. PATENT DOCUMENTS 6,707,490 B1 *   3/2004   Kido et al. ............. 348/211.14
2004/0028400 A1 *   2/2004   Murakami .................... 396/72

FOREIGN PATENT DOCUMENTS

| JP | 8-172561 A | 7/1996 |
| JP | 2000-50130 A | 2/2000 |
| JP | 2000-106640 A | 4/2000 |
| JP | 2000-175089 A | 6/2000 |

* cited by examiner

*Primary Examiner*—Bot LeDynh
(74) *Attorney, Agent, or Firm*—Sughrue Mion, PLLC

(57) ABSTRACT

A camera system is capable of exactly catching the subject at the time of release operation by the imaging device of the camera head in accordance with the release button operation at the side of the camera main frame, even if the camera head and the camera main frame are not formed in a unitary body. There are provided two dedicated lines for supplying to a head CPU a release signal according to the half-depression and a release signal according to the full-depression, respectively. Other signals are transmitted via serial interfaces to be driven by three-wire serial drivers. Only the release signals are transmitted from the camera main frame via the two dedicated lines to the camera head.

9 Claims, 15 Drawing Sheets

CAMERA SYSTEM

This application claims foreign priority under 35 U.S.C. 119 of Japanese Patent applications No. 2004-368004, filed Dec. 20, 2004, and No. 2004-368009, filed Dec. 20, 2004, the contents of which are incorporated herein by reference in their entirety.

BACKGROUND OF THE INVENTION

1. Field of the Invention

The present invention relates to a camera system comprising: a camera head having an image taking optical system and an imaging device; and a camera main frame on which the camera head is detachably mounted, the camera main frame applying signal processing to an image signal received from the camera head.

2. Description of the Related Art

Hitherto, there is proposed a camera system wherein when a plug-in unit, in which an imaging device is integral with an image taking optical system, is mounted on a camera main frame, information of the plug-in unit is transmitted to the camera main frame, so that the image taking optical system of the plug-in unit can perform photography (Japanese Patent Application Laid Open Gazette TokuKai Hei. 8-172561). Implementation of the camera system, in which an interchange of the image taking optical system or an image taking lens is carried out in such a way that the plug-in unit is simply mounted on the camera main frame, makes it possible that treatment of the camera system is very simplified, and whereby a person, who has no expert knowledge, can perform an interchange of the image taking lens.

As the similar camera system, there is proposed a camera system comprising: a camera head having an image taking optical system and an imaging device; and a camera main frame on which the camera head is detachably mounted, the camera main frame applying signal processing to image signal received from the camera head (Japanese Patent Application Laid Open Gazette TokuKai 2000-175089).

By the way, in the camera system having the camera head and the camera main frame, there is frequent such a case that the camera main frame is provided with a release button and the camera head is provided with an imaging device. In this case, when the release button of the camera main frame is subjected to a full-depression operation, a release signal according to the full-depression operation of the release button is transmitted via an interface placed between the camera head and the camera main frame to the imaging device of the camera head, so that the exposure of the imaging device is started. As the interface as mentioned above, there is used, for example, a serial interface (SIF) for a bilateral direction communication so that information necessary for imaging can be exchanged between the camera head and the camera main frame. In case of such an interface, in order to reduce the number of parts, there is provided such an arrangement that all control signals including the release signal that is one of the signals necessary for the imaging operation are supplied via the interface from the camera head to the camera main frame or from the camera main frame to the camera head.

However, in the event that the interface is occupied when it is intended that the release signal is supplied from the camera main frame via the interface to the imaging device of the camera head at the timing of the full-depression of the release button, the release signal is supplied after the occupation of the interface is terminated. For this reason, there will occur a time lag between a timing of the depression of the release button and an exposure start timing that ought to be the substantially same as the timing of the depression of the release button. The larger time lag, the later the exposure start time on the imaging device as compared with the release operation time. As a result, it is difficult to catch the subject at the intended release operation timing and it is obliged that the subject is caught in timing later a little. In the event that the still subject is photographed, it is not so effective, but in the event that the active subject is photographed, the occurrence of the time lag may oblige an operator to take a picture of a subject after a subject to be caught at the shutter chance is moved.

When the release button of the camera main frame is depressed, the release signal is transmitted via the interface between the camera head and the camera main frame to the imaging device of the camera head. A photometry section of the camera head performs photometry in accordance with the release signal. In some photometric value, it needs a flash light emission, and thus a light emission instruction signal for instructing the flash light emission is transmitted from the camera head via the interface to the camera main frame and the flash light is emitted, so that an exposure of the imaging device of the camera head is started.

However, in the event that the photometry section of the camera head performs photometry in timing of depression of the release button and it needs the flash light emission, if the interface is occupied, then there will occur a time lag between a timing that the light emission instruction signal is supplied to a flash light emission section and a timing of the release button operation. Thus, when the time lag occurs between the timing of the release button operation and the timing of supplying the light emission instruction signal, the time lag would prevent the proper light quantity to be supplied to a photo-receiving surface of the imaging device by the flash light emission from being supplied to the photo-receiving surface of the imaging device.

The influence by the time lag more extremely appears, as the shutter speed is higher. As an example that the influence by the time lag extremely appears, there is raised a daytime synchro-flash photography. What is meant by the daytime synchro-flash photography is that in the daytime a part of the subject intended in photography is involved in shadow, and a projection of the flash light to the shadow portion serves to remove the shadow so that the clear photography can be expected.

According to such a daytime synchro-flash photography, in view of the daytime, the photography is performed with the shorter of the shutter speed, and thus if the time lag occurs, it may happen that the flash light is emitted after the completion of the exposure.

SUMMARY OF THE INVENTION

In view of the foregoing, it is an object of the present invention to provide a camera system capable of exactly catching the subject at the time of release operation by the imaging device of the camera head in accordance with the release button operation at the side of the camera main frame, even if the camera head and the camera main frame are not formed in a unitary body.

To achieve the above-mentioned objects, the present invention provides a first camera system comprising: a camera head comprising an imaging optical system and an imaging device; and a camera main frame that receives an image signal from the camera head via an interface for transferring signals between the camera main frame and the camera head so as to perform signal processing, wherein the camera head comprises a first CPU and a timing generator that supplies exposure start signal and exposure completion signal according to a shutter speed of an electronic shutter to the imaging device in accordance with a control of the first CPU, the camera main frame comprises a second CPU and a release button for communicating a signal of a photography start to the second CPU, and the camera system further comprises a dedicated line connecting the camera main frame with the camera head, the dedicated line supplying a release signal according to depression of the release button to the first CPU of the camera head when the release signal is supplied to the second CPU in accordance with the depression of the release button.

According to the first camera system as mentioned above, the release signal for transmitting a signal of a photography start is supplied via the dedicated line to the second CPU of the camera head in accordance with the depression of the release button. The timing generator, which is controlled by the second CPU, supplies the exposure start signal to the imaging device in timing according to the depression of the release button, and thereafter supplies the exposure completion signal according to the shutter speed of the electronic shutter to the imaging device.

As mentioned above, according to the first camera system of the present invention, the release signal is supplied via the dedicated line to the second CPU in accordance with the depression of the release button so that the exposure start signal is promptly supplied to the imaging device. This feature makes it possible to implement a camera system capable of exactly catching the subject at the time of release operation by the imaging device of the camera head in accordance with the release button operation at the side of the camera main frame, even if the camera head and the camera main frame are not formed in a unitary body.

In the camera system according to the present invention as mentioned above, it is preferable that the release button has two operational modes of a half-depression mode for instructing a photography preparation and a full-depression mode for instructing a photography, and, the camera main frame transmits a release signal according to a half-depression via the interface to the camera head, and transmits a release signal according to a full-depression via the dedicated line to the camera head.

This feature makes it possible to promptly transmit the release signal according to the full-depression via the dedicated line to the second CPU so that the second CPU controls the timing generator in such a manner that the timing generator supplies the exposure start signal to the imaging device at the substantially same timing as the timing of the full-depression.

As to the release signal according to the half-depression, it is supplied via the interface. Thus, the simple improvement such that only one dedicated line is added makes it possible to solve the problem and also to contribute to a reduction of the cost.

However, this structure may involve such a problem that the release signal according to the full-depression to be transmitted via the dedicated line is transmitted to the second CPU of the camera head faster than the release signal according to the half-depression via the interface.

In view of the foregoing, in the camera system according to the present invention as mentioned above, it is preferable that when the camera head receives the release signal according to the full-depression before a receipt of the release signal according to the half-depression, the camera system performs a photography preparation in accordance with a receipt of the release signal according to the full-depression to perform a subsequent photography.

This feature makes it possible to catch the subject in the closest timing to the full-depression timing after the completion of the focusing control and the exposure control corresponding to the photography preparation, even if the full-depression of the release button is performed at once.

In the camera system according to the present invention as mentioned above, it is preferable that the release button has two operational modes of a half-depression mode for instructing a photography preparation and a full-depression mode for instructing a photography, and, the camera main frame transmits both the release signal according to the half-depression and the release signal according to the full-depression via the dedicated line to the camera head on a mutually distinguishable basis.

This feature makes it possible to prevent the order of the full-depression and the half-depression from being reversed, and whereby both the release signals are transmitted to the CPU of the camera head in sequence and promptly.

Further, to achieve the above-mentioned objects, the present invention provides a second camera system comprising: a camera head comprising an imaging optical system and an imaging device; and a camera main frame that receives an image signal from the camera head via an interface for transferring signals between the camera main frame and the camera head so as to perform signal processing, wherein the camera head has a timing generator that supplies exposure start signal and exposure completion signal to the imaging device, the camera main frame has a flash emission section for emitting a flash in synchronism with photography, and the camera system further comprises a dedicated line connecting the camera main frame with the camera head, wherein a light emission instruction signal is supplied from the camera head via the dedicated line to the camera main frame so that the flash emission section emits a flash during an exposure by the imaging device.

According to the second camera system as mentioned above, the light emission instruction signal is supplied via the dedicated line, but not the interface. This feature makes it possible to promptly supply the light emission instruction signal to the flash emission section of the camera main frame and thereby emitting the flash in good timing.

In the camera system according to the present invention as mentioned above, it is preferable that the light emission instruction signal comprises a light emission start signal and a light emission stop signal, and the flash emission section starts a flash emission upon receipt of the light emission start signal and stops the flash emission upon receipt of the light emission stop signal, and the dedicated line comprises two dedicated lines of a first dedicated line for transmitting the light emission start signal and a second dedicated line for transmitting the light emission stop signal.

The light emission time of the flash emitted from the flash emission section is a value having an effect on a light quantity, which is applied to the light receiving plane of the imaging device. In the event that the light emission time is not suitable, it would be difficult to apply a suitable light quantity to the light receiving plane of the imaging device.

In view of the foregoing, according to the present invention, there are provided two dedicated lines of the first dedicated line for transmitting the light emission start signal and the second dedicated line for transmitting the light emission stop signal so that the light emission time is strictly controlled. This feature makes it possible to apply the greater appropriate light quantity to the light receiving plane of the imaging device.

In the camera system according to the present invention as mentioned above, it is preferable that the light emission instruction signal comprises a light emission start signal and a light emission stop signal, and the flash emission section starts a flash emission upon receipt of the light emission start signal and stops the flash emission upon receipt of the light emission stop signal, and the dedicated line comprises a single dedicated line for transmitting both the light emission start signal and the light emission stop signal.

The adoption of two dedicated lines would increase the number of parts. Thus, according to the camera system of the present invention, there is used the single dedicated line for transmitting both the light emission start signal and the light emission stop signal. This feature makes it possible to reduce the number of parts and thereby contributing to the cost down.

DETAILED DESCRIPTION OF PREFERRED EMBODIMENTS

Embodiments of the present invention will be described with reference to the accompanying drawings.

Figure 1:
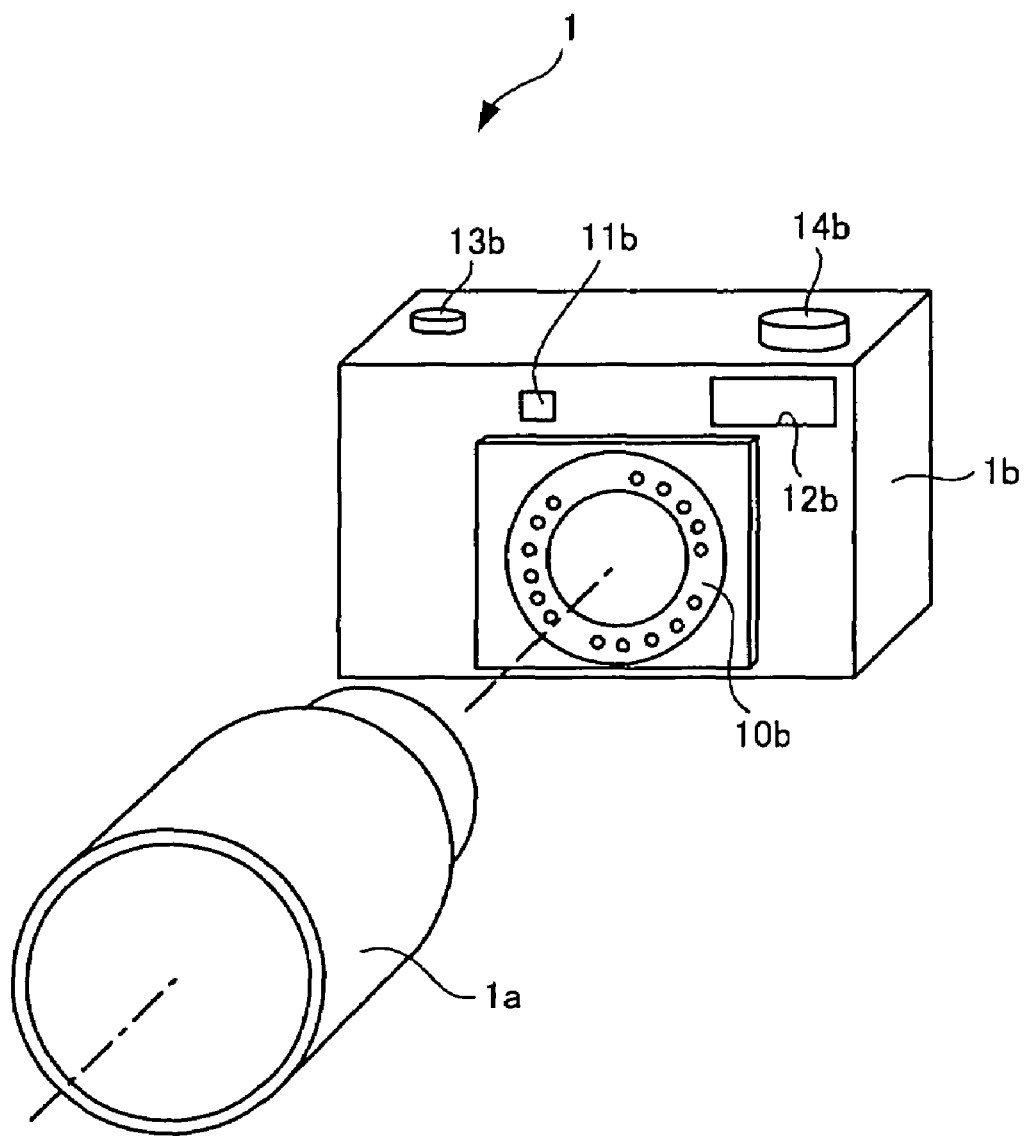
FIG. 1 is an exploded view of a camera system according to a first embodiment of the present invention.

FIG. 1 is an exploded view of a camera system according to a first embodiment of the present invention.

First, there will be explained a perspective view of a camera system according to the first embodiment of the present with reference to FIG. 1.

As shown in FIG. 1, a camera system 1 has a camera head 1a and a camera main frame 1b. FIG. 1 shows the camera head 1a having an image taking optical system and an imaging device, and the camera main frame 1b on which the camera head 1a is detachably mounted, the camera main frame 1b receiving an image signal from the camera head 1a and performing signal processing.

At the center of the camera main frame 1b, there is provided a head mount 10b having a large number of mount contacts. Also at the side of the camera head 1a, there is provided the similar mount section. When the camera head 1a is mounted on the camera main frame 1b along the dashed line in the figure so that the associated mount contacts of both the mount sections match with one another, the associated mount contacts of both the mount sections are connected with one another, so that the camera head 1a is electrically connected to the camera main frame 1b.

Of the large number of mount contacts, the respective ones are allotted for communications and electric power supplies so that there is performed a communication from the side of the camera main frame 1b to the side of the camera head 1a, there is performed a communication from the side of the camera head 1a to the side of the camera main frame 1b, and there is performed a power supply from the side of the camera main frame 1b to the side of the camera head 1a. Those mount contacts contain two mount contacts, to which two dedicated wires for supplying release signals are connected, respectively.

Upper the head mount 10b, there is disposed an AWB sensor 11b for detecting a sort of a light source at the time of photography. The sort of the light source indicates, for example, sunlight, or a fluorescence lamp. When the AWB sensor 11b detects the sort of the light source and a digital signal processing section, which will be described later, is set up with appropriate color temperature (for example, in case of the sunlight, it is 6000K, and in case of the fluorescence lamp, it is 4500K), the regulation for the optimum white balance is carried out. At the side of the AWB sensor 11b, there is disposed a flash emission window 12b. The camera main frame 1b incorporates therein a flash emission unit for emitting a flash through the flash emission window 12b. On the top of the body of the camera main frame 1b there are disposed a release button 13b and a mode dial 14b. The mode dial 14b serves to select an image taking mode and a reproducing mode. In the image taking mode, it is possible to optionally select any one among a still picture image taking mode, a dynamic picture image taking mode, and a full manual image taking mode. It is noted that FIG. 1 shows, by way of the example, one of a plurality of camera heads, and shows, by way of the example, one of a plurality of camera main frames. Incidentally, the mode dial 14b has a power switch in a unitary body. When the mode dial 14b is operated, the power turns on.

Now, there will be explained the internal structure of the camera head 1a and the camera main frame 1b with reference to FIG. 2.

Figure 2:
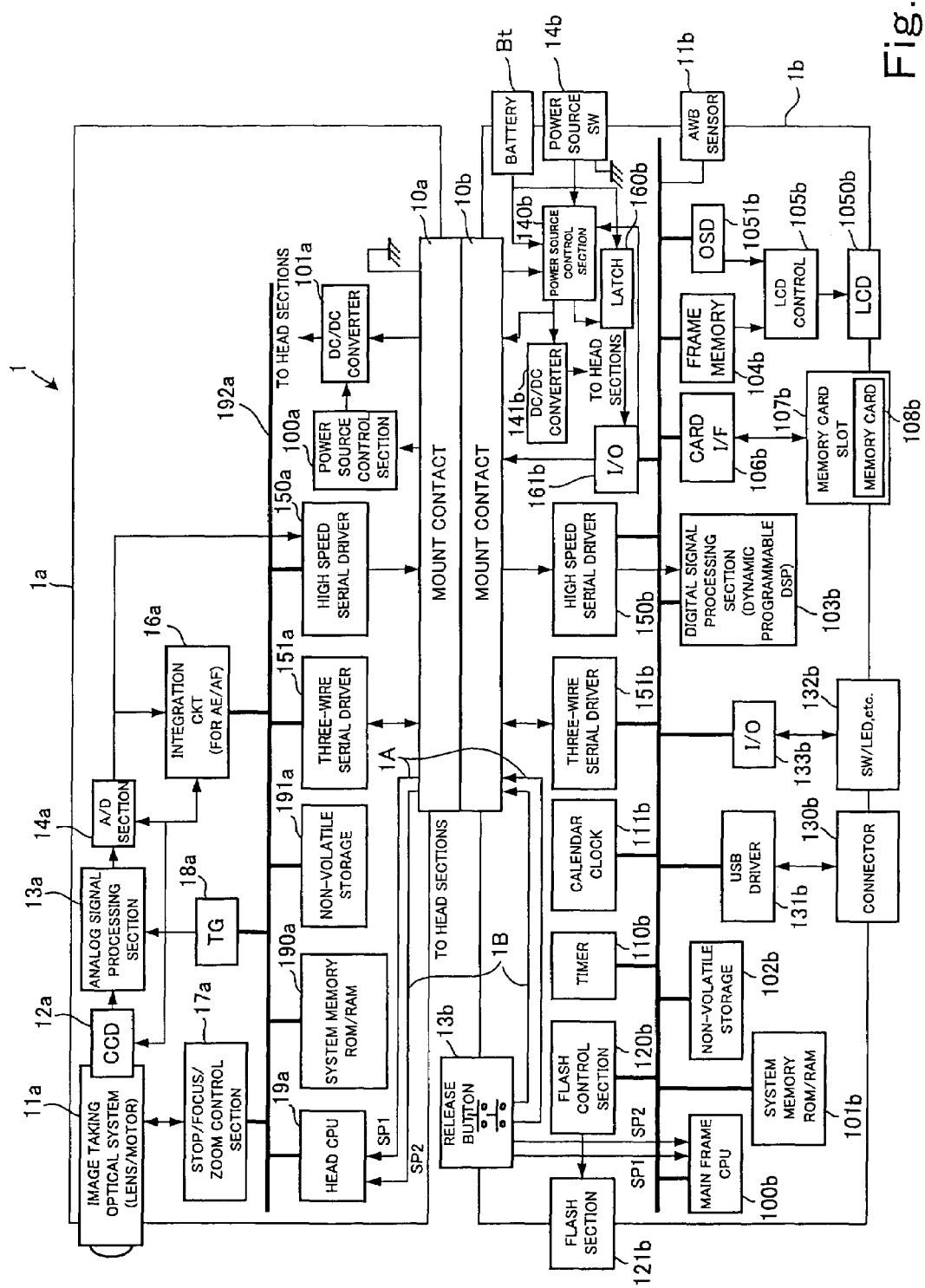
FIG. 2 is a block diagram of an electric system in a state that a camera head 1a is mounted on a camera main frame 1b.

FIG. 2 is a block diagram of an electric system in a state that the camera head 1a is mounted on the camera main frame 1b.

At the upper portion of FIG. 2, there is shown a structure of the camera head 1a, and at the lower portion of FIG. 2, there is shown a structure of the camera main frame 1b.

First, there will be explained the structure of the camera head 1a.

The camera head 1a, which constitutes the camera system 1 of the present embodiment, is mounted on the camera main frame 1b to receive a supply of electric power from a battery Bt of the camera main frame 1b so as to operate. According to the present embodiment, a power source control section 100a and a DC/DC converter 101a of the camera head 1a are controlled by a power source control section 140b of the camera main frame 1b. The power source control section 140b of the camera main frame 1b receives an operating signal from the power switch 14b, and also receives a ground signal from the camera head 1a via the mount contact when the camera head 1a is mounted. Upon receipt of those signals, the power source control section 140b rewrites the contents of a latch section 160b so that the contents of an I/O section 161b of a main frame CPU 100b is rewritten on a real time basis. This feature makes it possible for the main frame CPU 100b to always grasp the control contents of the power source control section 140b so that the optimum control can be carried out.

As seen from FIG. 2, the camera head 1a, which constitutes the camera system 1, has an image taking optical system 11a and an imaging device (here a CCD solid state imaging device is used, and thus it is referred to as CCD) 12a. The image taking optical system 11a includes an image taking lens and an aperture. The image taking lens of the image taking optical system 11a serves to form an image of the subject on the CCD 12a, so that the CCD 12a generates image data. The image data, which is generated in the CCD 12a, is fed to an analog signal processing section 13a to perform processing for noise reduction, and then an image signal in form of an analog signal is converted into an image signal in form of a digital signal by an A/D section 14a and thereafter the image signal in form of a digital signal is fed to a high speed serial driver 150a. A high speed serial interface, which is driven by the high speed serial driver 150a, serves to transmit the image signal in form of the digital signal to the camera main frame 1b. Of course, the camera main frame 1b is also provided with a high speed serial driver 150b for driving the high speed serial interface, and the high speed serial interface is driven by both the drivers. The image signals, which are supplied via the high speed serial interface to the camera main frame 1b, includes three ways of image signals, that is, a through image used image signal (hereinafter it is referred to as a through image signal) for displaying on an LCD panel (not illustrated) the subject caught by the image taking lens of the image taking optical system wherein any one of the photographic modes is selected by the mode dial 14b, an image signal (hereinafter it is referred to as a still picture signal) representative of a still picture image that is obtained through the operation of the release button 13b wherein the still picture image taking mode of the photographic modes is selected, an image signal (hereinafter it is referred to as a dynamic picture signal) representative of a dynamic picture image that is obtained through the operation of the release button 13b wherein the dynamic picture image taking mode of the photographic modes is selected. Any one of those image signals is transmitted via the high speed serial interface to the camera main frame 1b in accordance with a request from the camera main frame 1b.

On the other hand, the image signal, which is converted into the digital signal by the A/D section 14a, is also supplied to an integration circuit 16a that is provided at the subsequent stage of the A/D section 14a. The integration circuit 16a has an AF function and an AE function. The integration circuit 16a performs a measurement of the brightness of field to activate the AE function, and also performs a measurement of the subject distance to activate the AF function. The subject distance and the brightness of field, which are measured by the integration circuit 16a, are fed via a data bus 192a to a stop/focus/zoom control section 17a. The stop/focus/zoom control section 17a serves to control a diameter of the aperture in the image taking optical system, and also serves to control a position of the focus lens in the image taking optical system. This feature makes it possible to activate the AF function and the AE function whenever the lens of the image taking optical system is directed to different subject, so that the focusing and the control of the brightness are immediately performed and the CCD 12a creates image data representative of the focused subject.

The CCD 12a, the analog signal processing section 13a, the A/D section 14a and the integration circuit 16a are operative in synchronism with a timing signal generated from a timing generator (hereinafter it is referred to as TG) 18a. The operation of the TG 18a is controlled by a head CPU 19a that corresponds to the second CPU referred to in the present invention. The head CPU 19a performs a control of the TG 18a and the stop/focus/zoom control section 17a in accordance with the procedure of the program stored in the system memory 190a. The system memory 190a stores therein various types of software indicative of processing procedure for initialization, processing procedure as to the AE processing and the AF processing, and processing procedure as to communications through the serial interface. Those types of software include software as to through image processing that is activated when the image taking mode is selected by the mode dial and the still picture image taking mode is selected, software as to the still picture processing, and software as to the dynamic picture processing activated when the dynamic picture image taking mode is selected. The initialization of the camera head and the signal processing operation for every section after the initialization are controlled by the CPU 19a in accordance with those processing procedures as mentioned above. The operation of every section as mentioned above includes an operation of the integration circuit 16a, an operation of the TG 18a, an operation of read and write of a non-volatile storage 191a, an operation of a three-wire serial driver 151a, and an operation of a high speed serial driver 150a.

The non-volatile storage 191a stores therein configuration information for the camera head 1a and signal processing software too. When the camera main frame 1b transmits via a three-wire serial interface a command representative of a request of transmission of the configuration information, the configuration information stored in the non-volatile storage 191a is transmitted via the three-wire serial interface to the camera main frame 1b. The camera main frame 1b is also provided with a three-wire serial driver 151b for driving the three-wire serial interface. The use of the three-wire serial interface driven by both the three-wire serial drivers 151a and 151b makes it possible to perform communications from the camera main frame 1b to the camera head 1a, and from the camera head 1a to the camera main frame 1b. In the event that the camera main frame 1b transmits via the three-wire serial interface a command representative of a request of transmission of an image signal in addition to the request of transmission of the configuration information as mentioned above, the use of a high speed serial interface, which is higher than the three-wire serial interface, makes it possible to transmit the image signal in form of a digital signal to the camera main frame 1b.

Mounting the above mentioned camera head 1a on the camera main frame 1b may constitute the camera system 1.

Next, there will be explained the camera main frame 1b wherein the camera head 1a is mounted on the camera main frame 1b.

The operation of the camera head 1a on the camera main frame 1b is controlled by the main frame CPU 100b, which corresponds to the first CPU referred to in the present invention, in accordance with the procedure of the program stored in the system memory 101b. When the camera head 1a is mounted on the camera main frame 1b controlled by the main frame CPU 100*b* and the power source turns on, preparation for photography of the camera system is first established.

According to the camera system 1 of the present embodiment, when the power source turns on, first, the camera main frame 1*b* transmit a command representative of a request of transmission of a through image signal via the serial interface driven by the three-wire serial driver 151*b* to the camera head 1*a*. The head CPU 19*a* of the camera head receives the request of transmission of the through image signal and transmits the through image signal via the high speed serial interface driven by the high speed serial driver 150*a* to the camera main frame 1*b*. The through image signal, which is transmitted via the high speed serial interface to the camera main frame 1*b*, is fed to a digital signal processing section 103*b* so as to be subjected to the signal processing according to the configuration of the camera head, and then be stored in a frame memory 104*b*. The YC signal stored in the frame memory 104*b* is fed to a LCD control section 105*b* to display the through image on a panel of an LCD 1050*b*.

When an operator depresses the release button 13*b* while looking at the through image, the release signal is fed to both the main frame CPU 100*b* and the head CPU 19*a*. The release button 13*b* of the camera main frame 1*b* has two operational modes of a half-depression and a full-depression. Two types of release signals of a release signal SP1 according to the half-depression and a release signal SP2 according to the full-depression are fed to the camera head. Upon receipt of the release signals, the camera head causes the integration circuit 16*a* to perform the focussing control and exposure control in timing of the release signal SP1 according to the half-depression, and causes the CCD 12*a* to initiate the exposure in timing of the release signal SP2 according to the full-depression.

Since the timings of the release signals are very important, according to the present embodiment, there are provided two dedicated lines 1A and 1B so as to immediately supply the release signals SP1 and SP2 to the camera head 1*a*. As shown in FIG. 2, when the release button 13*b* of the camera main frame 1*b* is half-depressed, the release signal SP1 according to the half-depression is transmitted via the dedicated line 1A to the head CPU 19*a*, so that the integration circuit 16*a* performs the focusing control and the exposure control in accordance with the control of the head CPU 19*a*. When the release button 13*b* of the camera main frame 1*b* is full-depressed, the release signal SP2 according to the full-depression is transmitted via the dedicated line 1B to the head CPU 19*a*, so that the TG 18*a* supplies to the CCD 12*a* the exposure start signal at the substantially same timing as the depression of the release button 13*b* in accordance with the control of the head CPU 19*a*. Incidentally, since the TG 18*a* is for setting up the shutter speed to the CCD 12*a*, the TG 18*a* supplies the exposure start signal to the CCD 12*a*, and also supplies an exposure over signal after a predetermined time elapses. The mount contacts, which are explained with reference to FIG. 1, include repeater contacts for repeating the dedicated lines 1A and 1B, respectively.

This feature makes it possible to prevent occurrence of the time lag, and thus to perform focussing control and exposure control in synchronism with the release signal SP1 according to the half-depression, and makes it possible that the CCD 12*a* immediately starts the exposure in synchronism with the release signal SP2 according to the full-depression.

Thereafter, when a time corresponding to the shutter speed elapses, the head CPU 19*a* causes the TG 18*a* to supply the exposure over signal to the CCD 12*a* and causes the CCD 12*a* to output the still picture image signal consisting of the whole pixel data to the analog signal processing section 13*a*.

The still picture image signal outputted to the analog signal processing section 13*a* is fed from the analog signal processing section 13*a* via the A/D section 14A and the high speed serial interface to the digital signal processing section 103*b* in accordance with the control of the head CPU 19*a*, and a JPEG file, which is subjected to the JPEG compression by the digital signal processing section 103*b*, is stored via a card I/F 106*b* in a memory card 108*b* mounted on a memory card slot 107*b*. When the mode dial 14*b* is set to the dynamic mode, a dynamic picture processing program is activated in accordance with the operation of the release button 13*b*, so that the dynamic picture signal is fed for every a predetermined time via the high speed serial interface to the digital signal processing section 103*b* to perform the motion JPEG or MPEG compression and then be stored in the memory card 108*b*.

While it is not related directly to the present invention, the camera main frame 1*b* is provided with a timer 110*b* for timer processing and a calendar clock 111*b*. For example, when the calendar clock section supplies calendar data to the LCD control section 105*b*, clock and calendar may be displayed together with the subject on a panel of the LCD 1050*b*. The camera main frame 1*b* is further provided with an OSD (On Screen Display) 1051*b* for displaying characters on the LCD panel. The camera main frame 1*b* has a USB connector 130*b*. When a personal computer is connected via the USB connector 130*b* to the camera main frame 1*b*, the USB is driven by a USB driver 131*b* to transfer an image signal to the personal computer. The main frame CPU 100*b* controls via an I/O 133*b* a flash emission unit, which comprises the flash section 121*b* for emitting flash light through the flash emission window 12*b* as shown in FIG. 1, and a flash control section 120*b*, and a switch/LED 132*b* provided at the back of the camera main frame 1*b*.

As mentioned above, according to the present embodiment of the invention, even if the camera head 1*a* and the camera main frame 1*b* are not formed in a unitary body, it is possible to implement a camera system capable of exactly catching the subject by the CCD of the camera head in accordance with the operation of the release button of the camera main frame.

Figure 3:
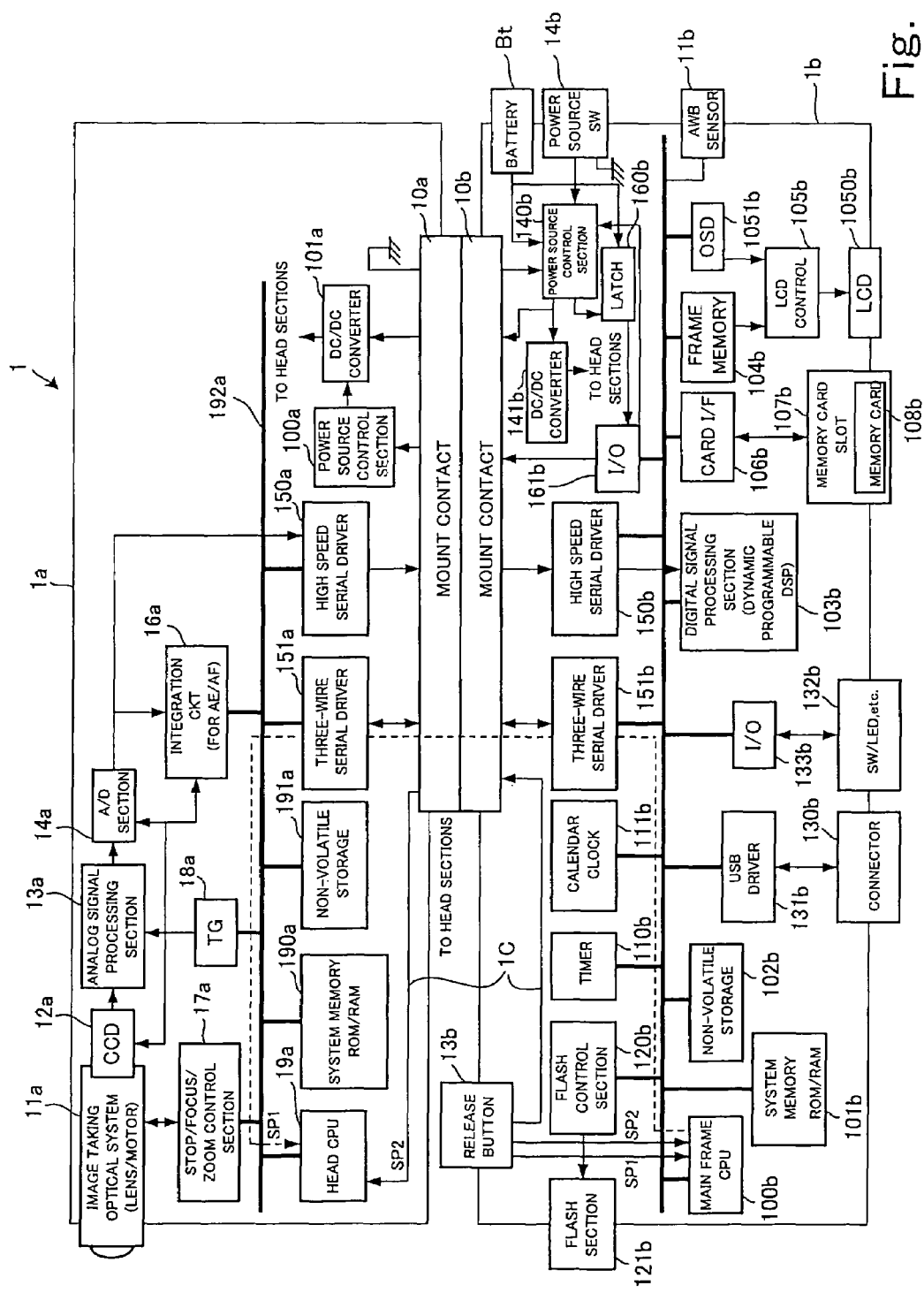
FIG. 3 is an internal structural view of the camera system according to a second embodiment of the present invention.

FIG. 3 is an internal structural view of the camera system according to a second embodiment of the present invention.

According to the first embodiment, both the release signal SP1 according to the half-depression and the release signal SP2 according to the full-depression are transmitted via the two dedicated lines 1A and 1B to the camera head 1*a*, respectively. To the contrary, according to the second embodiment, there is provided a single dedicated line 1C for supplying the release signal SP2 according to the full-depression, and the release signal SP1 according to the half-depression is supplied by the serial interface driven by the three-wire serial drivers 151*a* and 151*b*.

Thus, an adoption of the single dedicated line 1C makes it possible to reduce the number of parts and thereby contributing to cost down. Further, the release signal SP2 according to the full-depression is immediately transmitted to the head CPU 19*a* of the camera head 1*a* so that the TG 18*a* controlled by the head CPU 19*a* supplies an exposure start signal to the CCD 12*a* in synchronism with an operating timing of the full-depression. This feature makes it possible to extremely suppress, as compared with conventional one, an occurrence of the time lag between the timing of the release operation and the supplying timing of the exposure start signal to be supplied from the TG 18A to the CCD 12*a*.

According to the structure as mentioned above, however, it happens that the release signal SP2 according to the full-depression to be transmitted through the dedicated line 1C is faster transmitted to the CPU 19*a* of the camera head 1*a* than the release signal SP1 according to the half-depression to be transmitted through the serial interface to be driven by the three-wire serial drivers 151*a* and 151*b*.

In view of the foregoing, when the camera head 1*a* according to the present embodiment receives the release signal SP2 according to the full-depression before the release signal SP1 according to the half-depression, receipt of the release signal SP2 according to the full-depression causes photography preparation to carried out and then photography is carried out.

Figure 4:
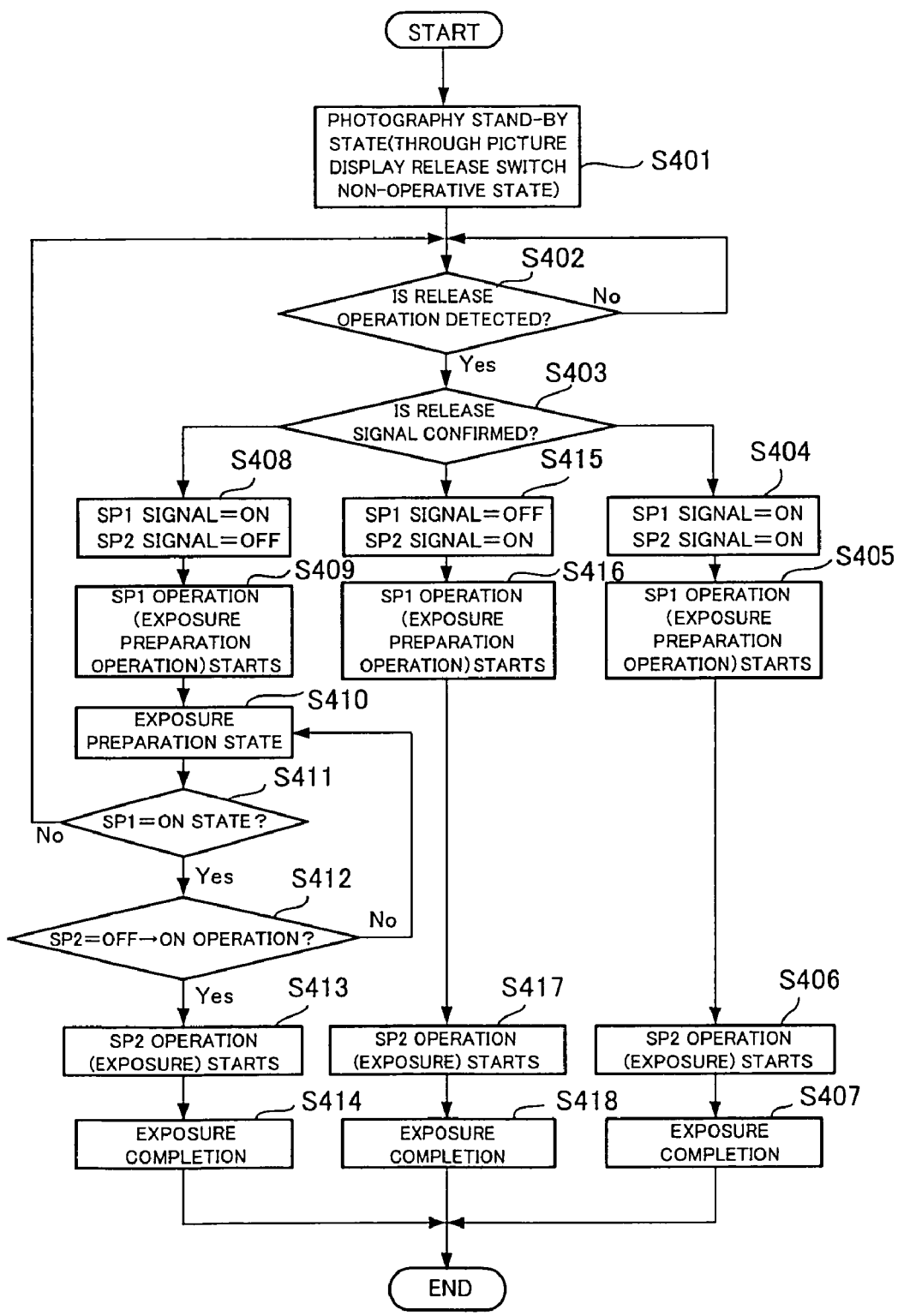
FIG. 4 is a flowchart useful for understanding release processing to be carried out by a head CPU 19a provided on a camera system shown in FIG. 3.

FIG. 4 is a flowchart useful for understanding release processing to be carried out by a head CPU 19*a* provided on a camera system shown in FIG. 3.

Step S401 indicates a start standby state up to the start of processing of the flow.

Step S402 determines whether the release operation is carried out in the state of the step S401. In the step S402, when it is decided that the release operation is carried out, the process goes to a "Yes" side, and when it is decided that the release operation is not carried out, the process goes to a "No" side and returns to the step S402.

When the process goes to the "Yes" side, step S403 determines the state of the release signals. The step S403 determines whether both the release signals SP1 and SP2 are in the state of turn on, and when it is decided that both the release signals SP1 and SP2 are in the state of turn on, that is, when it is concerned with a state of a step S404, the process goes to a step S405 in which an integration circuit performs the focusing control and the exposure control in accordance with a supply of the release signal SP1 according to the half-depression. Next, the process goes to a step S405 in which the TG 14*a* is controlled in accordance with the release signal SP2 according to the full-depression so that the CCD 12*a* initiates an exposure. Next, the process goes to a step S406 in which the exposure is completed and all the processing is terminated.

In the step S403, when it is decided that the release signal SP1 according to the half-depression is in a state of the turn-on and the release signal SP2 according to the full-depression is in a state of the turn-off, the process goes from the step S408 to a step S409 in which in which the integration circuit performs the focusing control and the exposure control in accordance with the release signal SP1 according to the half-depression, so that a step S410 offers the exposure ready state. Next, the process goes to a step S411 in which it is decided whether the release signal SP1 according to the half-depression retains the state of the turn-on.

In the step S411, when it is decided that the release signal SP1 according to the half-depression does not retain the state of the turn-on, and the release button 13*b* is released from the half-depression state so as to be returned to the home position, the process goes to the side "No" of the step S411 to return the step S402, and the processing is repeated from the step S402.

In the step S411, when it is decided that the release signal SP1 according to the half-depression retains the state of the turn-on, the process goes to the side "Yes" of the step S411, that is, goes to a step S412 in which it is decided whether the release signal SP2 according to the full-depression transfers in the state from the turn-off to the turn-on. In the step S412, when it is decided that the release signal SP2 does not transfer, the process returns to the step S410 and repeats the processing from the step S410 to the step S413. In the step S412, when it is decided that the full-depression is concerned, the process goes to a step S413 in which an exposure is initiated. Next, the process goes to a step S414 in which the exposure is completed and all the processing is terminated.

In the step S403, when it is decided that the release signal SP1 according to the half-depression offers the state of the turn-off, and the release signal SP2 according to the full-depression offers the state of the turn-on, that is, when a step S415 is concerned, the process goes from the step S415 to a step S416 in which the focusing control and the exposure control are performed. When the focusing control and the exposure control are completed, the process goes to a step S417 in which the exposure is initiated. Next, the process goes to a step S418 in which the exposure is completed and all the processing is terminated.

There is a possibility that the release signal SP2 according to the full-depression, which is transmitted via the dedicated line 1C, is faster transmitted to the CPU 19*a* of the camera head 1*a* than the release signal SP1 according to the half-depression to be transmitted through the serial interface to be driven by the three-wire serial drivers 151*a* and 151*b* (cf. FIG. 2). In view of the foregoing, the processing of the step S415 to the step S418 are provided.

That is, as mentioned above, when the camera head 1*a* according to the present embodiment receives the release signal SP2 according to the full-depression before the release signal SP1 according to the half-depression, receipt of the release signal SP2 according to the full-depression causes photography preparation to carried out and then photography is carried out.

In this manner, in the event that the release button is full-depressed at once, it is possible to catch the subject in the closet timing to the full-depression timing after focusing control and the exposure control corresponding to the photography preparation, and thereafter the photography is carried out.

Incidentally, the processing of the step S404 to the step S407 is provided for coping with the rear case to occur.

Figure 5:
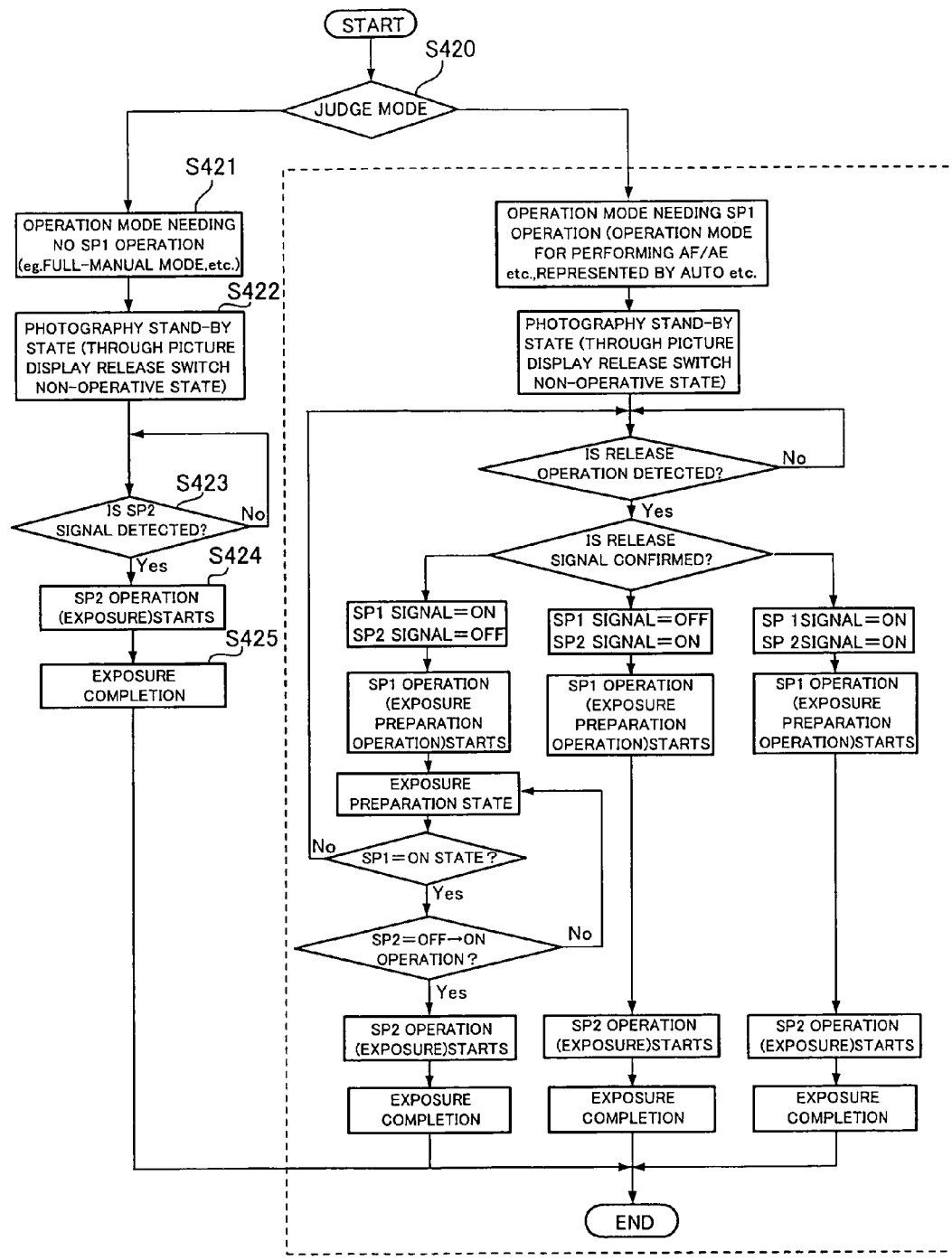
FIG. 5 is a flowchart useful for understanding release processing to be carried out by the head CPU 19a when a full manual mode of the photographic mode dial is designated.

FIG. 5 is a flowchart useful for understanding release processing to be carried out by the head CPU 19*a* when a full manual mode of the photographic mode dial is designated.

As mentioned above, the camera system 1 has the full manual mode, and when the full manual mode is designated, the focusing control and the exposure control are manually set up by an operation of an operating ring (not illustrated). When the full manual mode is designated, the CPU19*a* performs only processing for the release signal SP2 according to the full-depression, since there is no need to perform the focusing control and the exposure control in accordance with the supply of the release signal SP1 according to the half-depression.

First, in a step S420, it is decided whether a full manual mode is designated, or an auto-mode including still picture photography and dynamic picture photography mode is designated. In the step S420, it is decided that the full manual mode is designated, the process goes via a step S421 to a step S422 in which it offers a standby state waiting a supply of the release signal SP2 according to the full-depression, since there is no need to perform the processing according to the release signal SP1 according to the half-depression. In a step S423, when the release signal SP2 according to the full-depression is detected during the standby state, the process goes to a step S424 in which the exposure is initiated in accordance with the release signal SP2. Next, the process goes to a step S425 in which the exposure is completed and all the processing is terminated.

In the step S420, when it is decided that the auto-mode is designated, the same processing as FIG. 4 is carried out.

Figure 6:
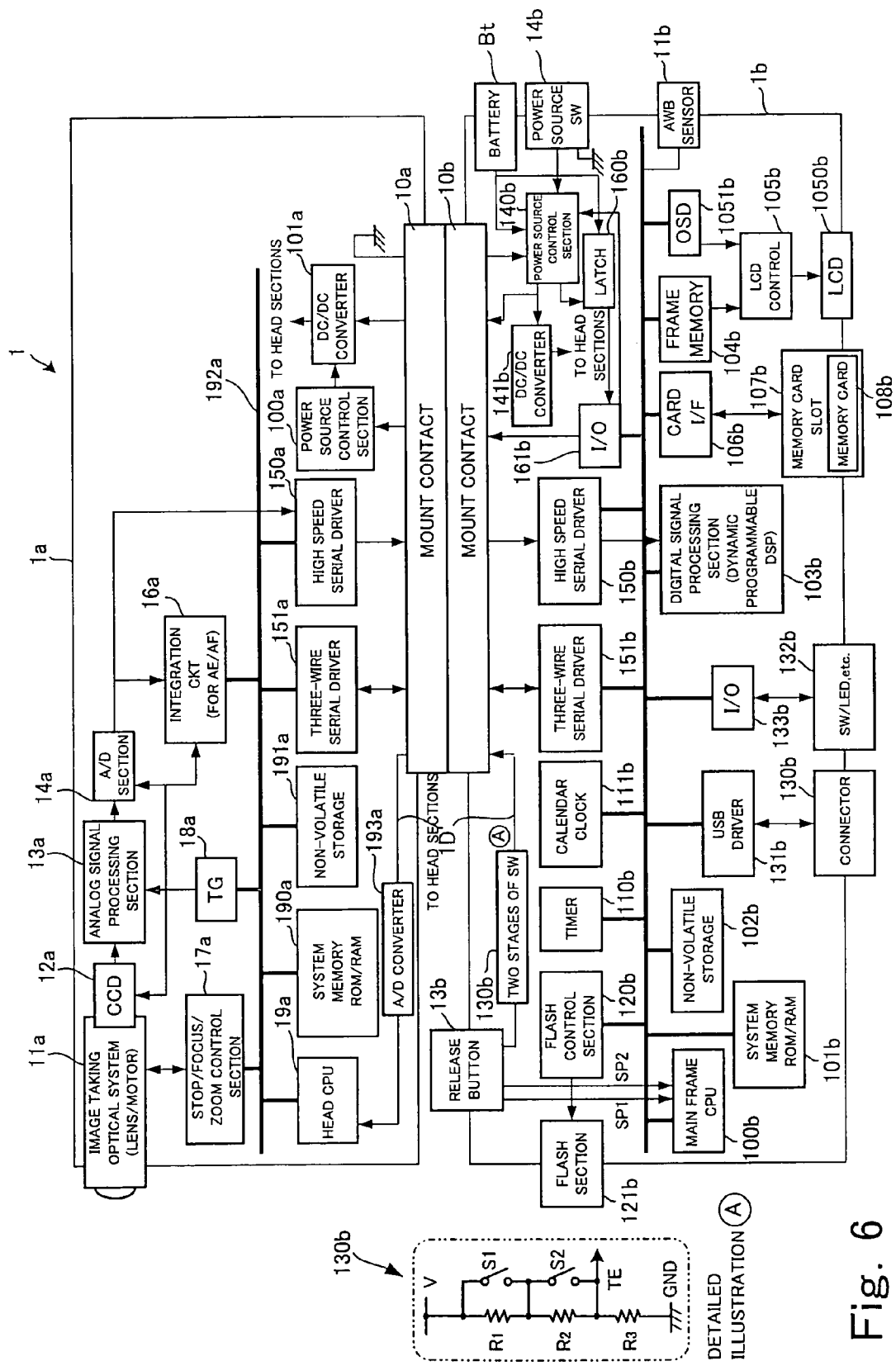
FIG. 6 is an internal structural view of the camera system according to a third embodiment of the present invention.

FIG. 6 is an internal structural view of the camera system according to a third embodiment of the present invention.

According to the third embodiment, there is provided such an improvement that two stages of switches 130*b* consisting of two switches S1 and S2 are provided below the release button 13*b* and a voltage signal, which is generated from a branch point TE of the two stages of switches, is transmitted to the camera head 1a. In accordance with such an improvement that the voltage signal is transmitted from the camera main frame 1b to the camera head 1a, the camera head 1a is additionally provided with an A/D converter 193a for receiving the voltage signal so that a digital signal generated from the A/D converter 193a is supplied to the head CPU 19a.

Here, there will be explained a circuit structure of the two stages of switches 130b with reference to a detailed illustration A shown in FIG. 6.

As shown in the detailed illustration A in FIG. 6, there are connected three resistances R1, R2, and R3 between an operational power source V and the ground GND. The first switch S1 is connected to the first resistance R1 in parallel. The second switch S2 is connected to the second resistance R2 in parallel. The first switch S1 is closed when the half-depression is made. When the first switch S1 is closed by the half-depression operation, the both edges of the first resistance R1 are shorten to form a resistance division circuit consisting of only two resistances R2 and R3. Thus, the branch point TE may generate a voltage signal V1 according to a resistance dividing ratio of the second resistance R2 and the third resistance R3, so that the voltage signal V1 is supplied via a dedicated line 1D connected to the branch point TE to the camera head 1a. When the voltage signal V1 is supplied via the mount contacts 10a and 10b to the camera head 1a, the A/D converter 193a of the camera head 1a converts the voltage signal V1 to a digital signal and supplies the digital signal to the head CPU 19a. Upon receipt of the digital signal, the head CPU 19a detects that the digital signal is concerned with the release signal SP1 according to the half-depression and causes the integration circuit 16a to perform the AE/AF processing.

When the full-depression operation is made, the first switch S1 and the second switch S2 are closed to short the first resistance R1 and the second resistance R2, so that the operational voltage V is supplied via the dedicated line 1D to the camera head. The A/D converter 193a converts the operational voltage V into a digital signal and supplies the digital signal to the head CPU 19a. Upon receipt of the digital signal, the head CPU 19a causes the TG 18a to supply the exposure start signal to the CCD 12a so as to start the exposure. Thereafter, when a time according to the shutter speed elapses, the head CPU 19a causes the TG 18a to supply the exposure termination signal so as to terminate the exposure.

This feature makes it possible to use a single dedicated line 1D for connecting the camera head 1a to the camera main frame 1b, and thereby contributing to cost down of the camera system owing to the reduction of the number of parts.

Figure 7:
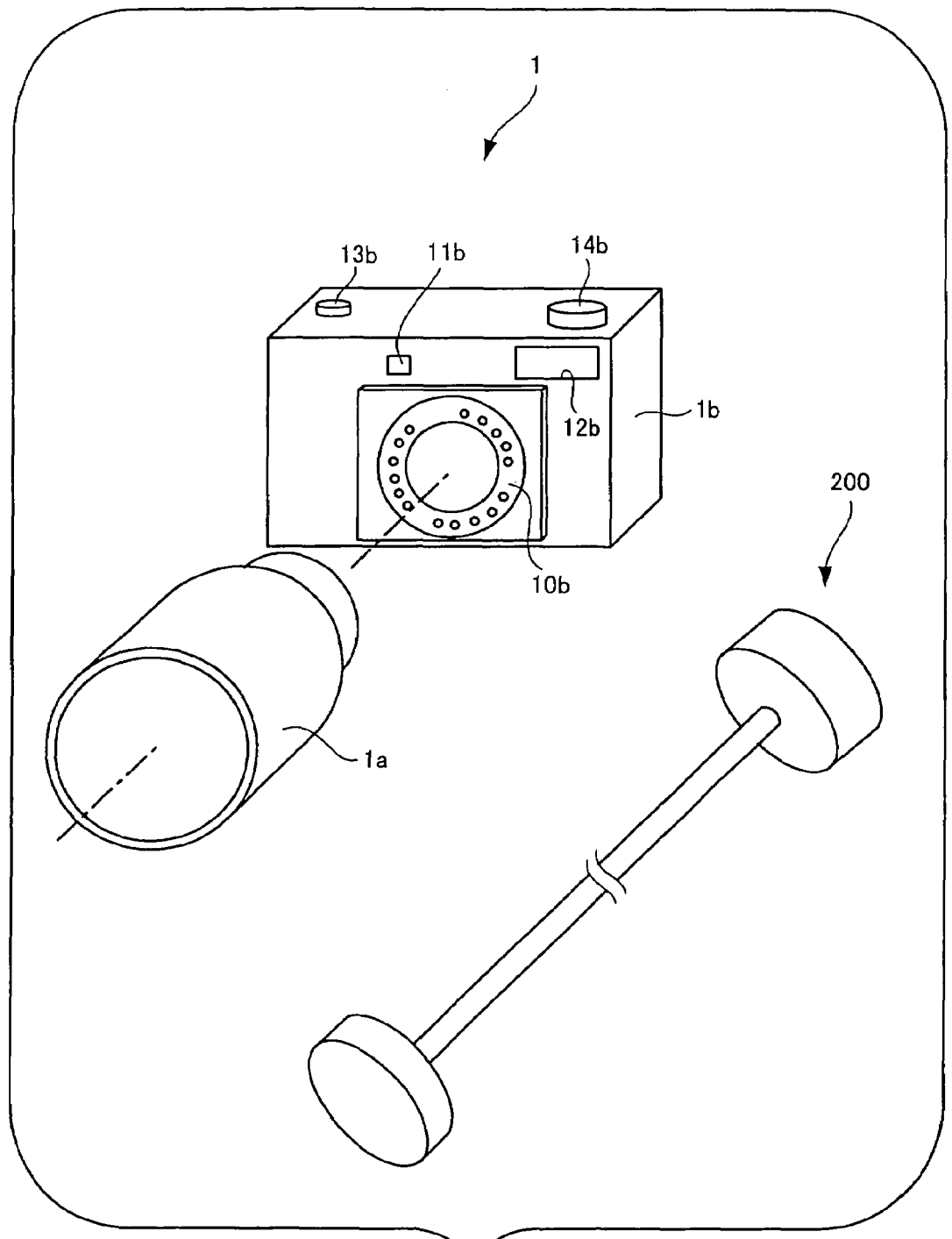
FIG. 7 is a perspective view of the camera system according to a fourth embodiment of the present invention.

FIG. 7 is a perspective view of the camera system according to a fourth embodiment of the present invention.

According to the first embodiment of the present invention, there is disclosed the camera system in which the camera head 1a is directly mounted on the camera main frame 1b to perform photography. It is acceptable, however, that the camera head 1a is disposed in the vicinity of a door as a monitor and the camera main frame 1b is disposed in the monitor.

In this case, the camera head 1a is connected via a connecting cable 200 as shown in FIG. 7 to the camera main frame 1b. Such a connection makes it possible to use the system as a monitor camera system.

Figure 8:
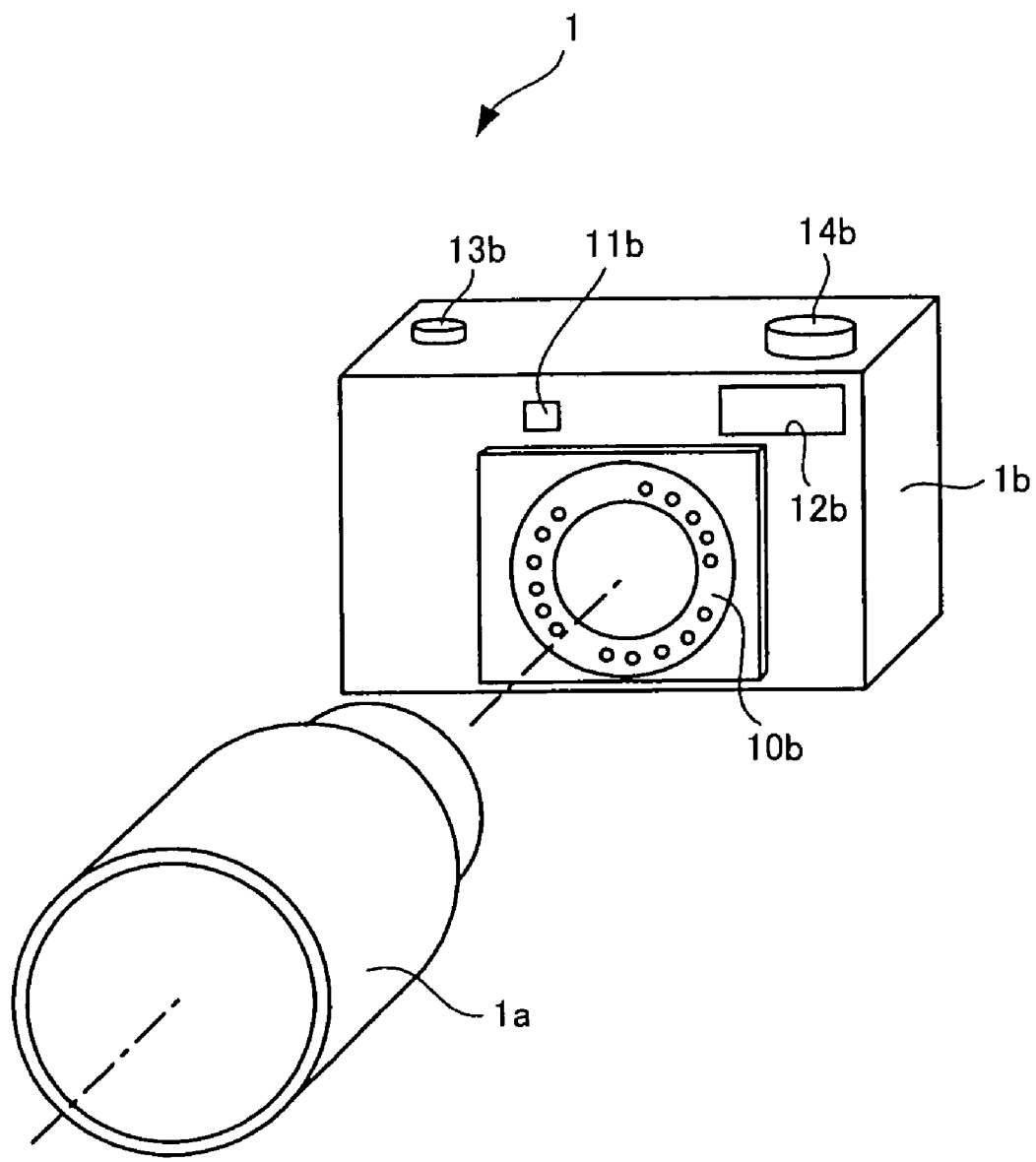
FIG. 8 is an exploded view of a camera system according to a fifth embodiment of the present invention.

FIG. 8 is an exploded view of a camera system according to a fifth embodiment of the present invention.

First, there will be explained a perspective view of a camera system according to the fifth embodiment of the present with reference to FIG. 8.

As shown in FIG. 8, a camera system 1 has a camera head 1a and a camera main frame 1b. FIG. 1 shows the camera head 1a having an image taking optical system and an imaging device, and the camera main frame 1b on which the camera head 1a is detachably mounted, the camera main frame 1b receiving an image signal from the camera head 1a and performing signal processing.

At the center of the camera main frame 1b, there is provided a head mount 10b having a large number of mount contacts. Also at the side of the camera head 1a, there is provided the similar mount section. When the camera head 1a is mounted on the camera main frame 1b along the dashed line in the figure so that the associated mount contacts of both the mount sections match with one another, the associated mount contacts of both the mount sections are connected with one another, so that the camera head 1a is electrically connected to the camera main frame 1b.

Of the large number of mount contacts, the respective ones are allotted for communications and electric power supplies so that there is performed a communication from the side of the camera main frame 1b to the side of the camera head 1a, there is performed a communication from the side of the camera head 1a to the side of the camera main frame 1b, and there is performed a power supply from the side of the camera main frame 1b to the side of the camera head 1a. Those mount contacts contain a mount contact, to which a dedicated wire for supplying a flash emission start signal is connected.

Upper the head mount 10b, there is disposed an AWB sensor 11b for detecting a sort of a light source at the time of photography. The sort of the light source indicates, for example, sunlight, or a fluorescence lamp. When the AWB sensor 11b detects the sort of the light source and a digital signal processing section, which will be described later, is set up with appropriate color temperature (for example, in case of the sunlight, it is 6000K, and in case of the fluorescence lamp, it is 4500K), the regulation for the optimum white balance is carried out. At the side of the AWB sensor 11b, there is disposed a flash emission window 12b. The camera main frame 1b incorporates therein a flash emission unit for emitting a flash through the flash emission window 12b. On the top of the body of the camera main frame 1b there are disposed a release button 13b and a mode dial 14b. The mode dial 14b serves to select an image taking mode and a reproducing mode. In the image taking mode, it is possible to optionally select any one among a still picture image taking mode, and a dynamic picture image taking mode. It is noted that FIG. 8 shows, by way of the example, one of a plurality of camera heads, and shows, by way of the example, one of a plurality of camera main frames. Incidentally, the mode dial 14b has a power switch in a unitary body. When the mode dial 14b is operated, the power turns on.

Now, there will be explained the internal structure of the camera head 1a and the camera main frame 1b with reference to FIG. 9.

Figure 9:
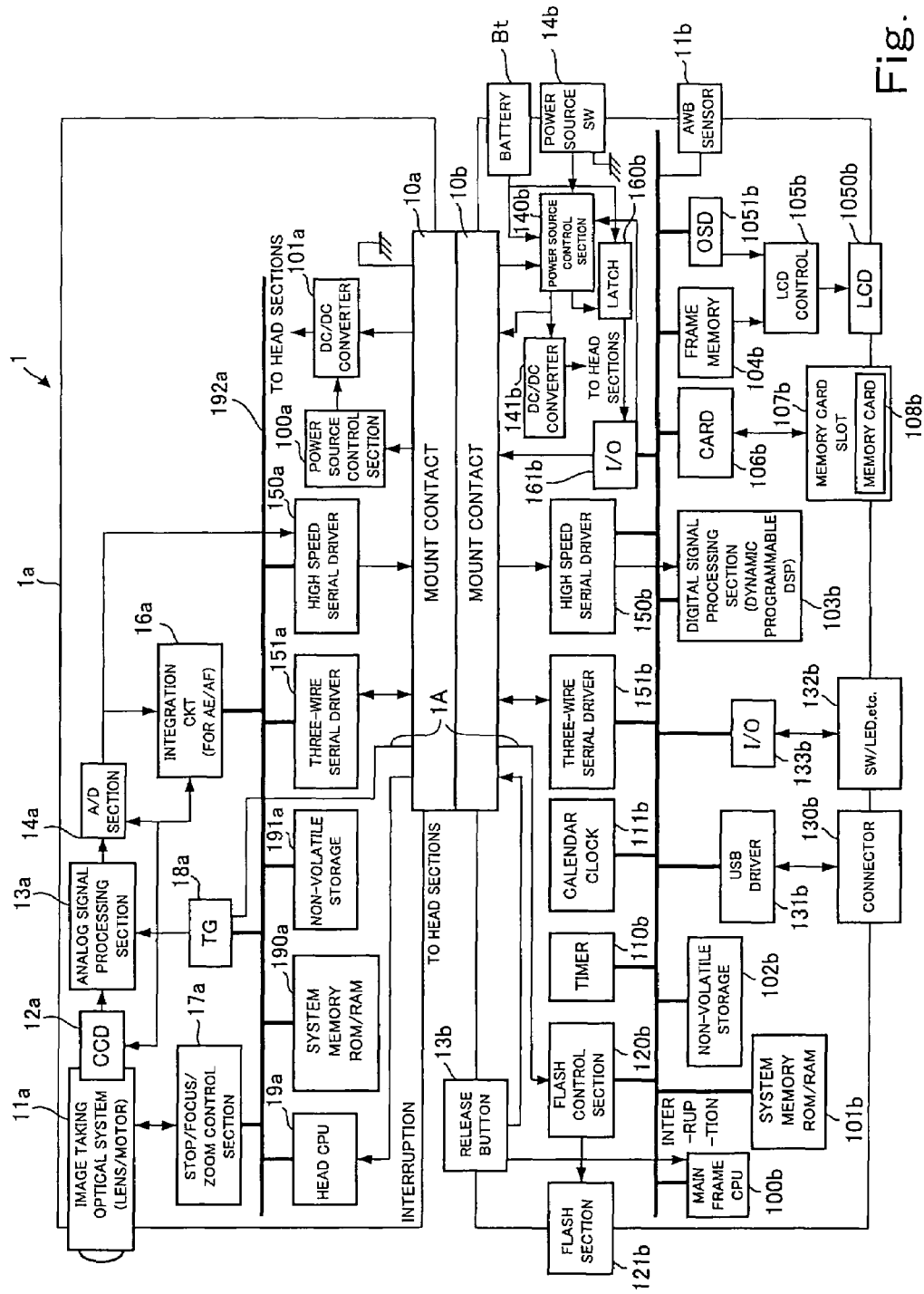
FIG. 9 is a block diagram of an electric system in a state that a camera head 1a is mounted on a camera main frame 1b.

FIG. 9 is a block diagram of an electric system in a state that a camera head 1a is mounted on a camera main frame 1b.

At the upper portion of FIG. 9, there is shown a structure of the camera head 1a, and at the lower portion of FIG. 9, there is shown a structure of the camera main frame 1b.

First, there will be explained the structure of the camera head 1a.

The camera head 1a, which constitutes the camera system 1 of the present embodiment, is mounted on the camera main frame 1b to receive a supply of electric power from a battery Bt of the camera main frame 1b so as to operate. According to the present embodiment, a power source control section 100a and a DC/DC converter 101a of the camera head 1a are controlled by a power source control section 140*b* of the camera main frame 1*b*. The power source control section 140*b* of the camera main frame 1*b* receives an operating signal from the power switch 14*b*, and also receives a ground signal from the camera head 1*a* via the mount contact when the camera head 1*a* is mounted. Upon receipt of those signals, the power source control section 140*b* rewrites the contents of a latch section 160*b* so that the contents of an I/O section 161*b* of a main frame CPU 100*b* is rewritten on a real time basis. This feature makes it possible for the main frame CPU 100*b* to always grasp the control contents of the power source control section 140*b* so that the optimum control can be carried out.

As seen from FIG. 9, the camera head 1*a*, which constitutes the camera system 1, has an image taking optical system 11*a* and an imaging device (here a CCD solid state imaging device is used, and thus it is referred to as CCD) 12*a*. The image taking optical system 11*a* includes an image taking lens and an aperture. The image taking lens of the image taking optical system 11*a* serves to form an image of the subject on the CCD 12*a*, so that the CCD 12*a* generates image data. The image data, which is generated in the CCD 12*a*, is fed to an analog signal processing section 13*a* to perform processing for noise reduction, and then an image signal in form of an analog signal is converted into an image signal in form of a digital signal by an A/D section 14*a* and thereafter the image signal in form of a digital signal is fed to a high speed serial driver 150*a*. A high speed serial interface, which is driven by the high speed serial driver 150*a*, serves to transmit the image signal in form of the digital signal to the camera main frame 1*b*. Of course, the camera main frame 1*b* is also provided with a high speed serial driver 150*b* for driving the high speed serial interface, and the high speed serial interface is driven by both the drivers. The image signals, which are supplied via the high speed serial interface to the camera main frame 1*b*, includes three ways of image signals, that is, a through image used image signal (hereinafter it is referred to as a through image signal) for displaying on an LCD panel (not illustrated) the subject caught by the image taking lens of the image taking optical system wherein any one of the photographic modes is selected by the mode dial 14*b*, an image signal (hereinafter it is referred to as a still picture signal) representative of a still picture image that is obtained through the operation of the release button 13*b* wherein the still picture image taking mode of the photographic modes is selected, an image signal (hereinafter it is referred to as a dynamic picture signal) representative of a dynamic picture image that is obtained through the operation of the release button 13*b* wherein the dynamic picture image taking mode of the photographic modes is selected. Any one of those image signals is transmitted via the high speed serial interface to the camera main frame 1*b* in accordance with a request from the camera main frame 1*b*.

On the other hand, the image signal, which is converted into the digital signal by the A/D section 14*a*, is also supplied to an integration circuit 16*a* that is provided at the subsequent stage of the A/D section 14*a*. The integration circuit 16*a* has an AF function and an AE function. The integration circuit 16*a* performs a measurement of the brightness of field to activate the AE function, and also performs a measurement of the subject distance to activate the AF function. The subject distance and the brightness of field, which are measured by the integration circuit 16*a*, are fed via a data bus 192*a* to a stop/focus/zoom control section 17*a*. The stop/focus/zoom control section 17*a* serves to control a diameter of the aperture in the image taking optical system, and also serves to control a position of the focus lens in the image taking optical system. This feature makes it possible to activate the AF function and the AE function whenever the lens of the image taking optical system is directed to different subject, so that the focusing and the control of the brightness are immediately performed and the CCD 12*a* creates image data representative of the focused subject.

The CCD 12*a*, the analog signal processing section 13*a*, the A/D section 14*a* and the integration circuit 16*a* are operative in synchronism with a timing signal generated from a timing generator (hereinafter it is referred to as TG) 18*a*. The operation of the TG 18*a* is controlled by a head CPU 19*a*. The head CPU 19*a* performs a control of the TG 18*a* and the stop/focus/zoom control section 17*a* in accordance with the procedure of the program stored in the system memory 190*a*. The system memory 190*a* stores therein various types of software indicative of processing procedure for initialization, processing procedure as to the AE processing and the AF processing, and processing procedure as to communications through the serial interface. Those types of software include software as to through image processing that is activated when the image taking mode is selected by the mode dial and the still picture image taking mode is selected, software as to the still picture processing, and software as to the dynamic picture processing activated when the dynamic picture image taking mode is selected. The initialization of the camera head and the signal processing operation for every section after the initialization are controlled by the CPU 19*a* in accordance with those processing procedures as mentioned above. The operation of every section as mentioned above includes an operation of the integration circuit 16*a*, an operation of the TG 18*a*, an operation of read and write of a non-volatile storage 191*a*, an operation of a three-wire serial driver 151*a*, and an operation of a high speed serial driver 150*a*.

The non-volatile storage 191*a* stores therein configuration information for the camera head 1*a* and signal processing software too. When the camera main frame 1*b* transmits via a three-wire serial interface a command representative of a request of transmission of the configuration information, the configuration information stored in the non-volatile storage 191*a* is transmitted via the three-wire serial interface to the camera main frame 1*b*. The camera main frame 1*b* is also provided with a three-wire serial driver 151*b* for driving the three-wire serial interface. The use of the three-wire serial interface driven by both the three-wire serial drivers 151*a* and 151*b* makes it possible to perform communications from the camera main frame 1*b* to the camera head 1*a*, and from the camera head 1*a* to the camera main frame 1*b*. In the event that the camera main frame 1*b* transmits via the three-wire serial interface a command representative of a request of transmission of an image signal in addition to the request of transmission of the configuration information as mentioned above, the use of a high speed serial interface, which is higher than the three-wire serial interface, makes it possible to transmit the image signal in form of a digital signal to the camera main frame 1*b*.

Mounting the above mentioned camera head 1*a* on the camera main frame 1*b* may constitute the camera system 1.

Next, there will be explained the camera main frame 1*b* wherein the camera head 1*a* is mounted on the camera main frame 1*b*.

The operation of the camera head 1*a* on the camera main frame 1*b* is controlled by the main frame CPU 100*b* in accordance with the procedure of the program stored in the system memory 101*b*. When the camera head 1*a* is mounted on the camera main frame 1*b* controlled by the main frame CPU 100*b* and the power source turns on, preparation for photography of the camera system is first established.

According to the camera system 1 of the present embodiment, when the power source turns on, first, the camera main frame 1b transmit a command representative of a request of transmission of a through image signal via the serial interface driven by the three-wire serial driver 151b to the camera head 1a. The head CPU 19a of the camera head receives the request of transmission of the through image signal and transmits the through image signal via the high speed serial interface driven by the high speed serial driver 150a to the camera main frame 1b. The through image signal, which is transmitted via the high speed serial interface to the camera main frame 1b, is fed to a digital signal processing section 103b so as to be subjected to the signal processing according to the configuration of the camera head, and then be stored in a frame memory 104b. The YC signal stored in the frame memory 104b is fed to a LCD control section 105b to display the through image on a panel of an LCD 1050b.

When an operator depresses the release button 13b while looking at the through image, the release signal is fed to both the main frame CPU 100b and the head CPU 19a. The release button 13b of the camera main frame 1b has two operational modes of a half-depression and a full-depression. Two types of release signals of a release signal SP1 according to the half-depression and a release signal SP2 according to the full-depression are fed to the head CPU 19a of the camera head 1a. Upon receipt of the release signals, the head CPU 19a of the camera head 1a causes the integration circuit 16a to perform the focussing control and exposure control in timing of the release signal SP1 according to the half-depression, and causes the CCD 12a to initiate the exposure in timing of the release signal SP2 according to the full-depression.

In the event that a photometric value, which is obtained through the exposure control by the integration circuit 16a, is a low value, the head CPU 19a receives the photometric value and causes the TG 18a to supply a light emission start signal to the flash control section 120b of the camera main frame 1b so that the flash control section 120b causes the flash section 121b to emit the flash. The flash control section 120b and the flash section 121b correspond to the flash emission section referred to in the present invention.

As mentioned above, since the timings of the release signals are very important, according to the present embodiment, there is provided a dedicated line 1A. As shown in FIG. 9, when the release button 13b of the camera main frame 1b is half-depressed, the release signal SP1 according to the half-depression is transmitted via the serial interface driven by the three-wire serial drivers 150a and 150b to the head CPU 19a, so that the integration circuit 16a performs the focusing control and the photometry control in accordance with the control of the head CPU 19a. In the event that the head CPU 19a receives the photometric value and it is decided that the flash emission is required, the dedicated line 1A is used to transmit a light emission start instruction from the TG18a to the flash control section 120b of the camera main frame 120b.

When the release button 13b of the camera main frame 1b is full-depressed, the release signal SP2 according to the full-depression is transmitted via the interface to the head CPU 19a, and the TG 18a supplies to the CCD 12a the exposure start signal in accordance with the control of the head CPU 19a so that an image signal representative of the subject is created on the imaging device.

This feature makes it possible to prevent occurrence of the time lag, and thus to surely emit flash during the exposure of the imaging device, since the serial interface does not supply the light emission start signal and the light emission stop signal.

Thereafter, when a time corresponding to the shutter speed elapses, the head CPU 19a causes the TG 18a to supply the exposure over signal to the CCD 12a and causes the CCD 12a to output the still picture image signal consisting of the whole pixel data to the analog signal processing section 13a.

The still picture image signal outputted to the analog signal processing section 13a is fed from the analog signal processing section 13a via the A/D section 14A and the high speed serial interface to the digital signal processing section 103b in accordance with the control of the head CPU 19a, and a JPEG file, which is subjected to the JPEG compression by the digital signal processing section 103b, is stored via a card I/F 106b in a memory card 108b mounted on a memory card slot 107b. When the mode dial 14b is set to the dynamic mode, a dynamic picture processing program is activated in accordance with the operation of the release button 13b, so that the dynamic picture signal is fed for every a predetermined time via the high speed serial interface to the digital signal processing section 103b to perform the motion JPEG or MPEG compression and then be stored in the memory card 108b.

While it is not related directly to the present invention, the camera main frame 1b is provided with a timer 110b for timer processing and a calendar clock 111b. For example, when the calendar clock section supplies calendar data to the LCD control section 105b, clock and calendar may be displayed together with the subject on a panel of the LCD 1050b. The camera main frame 1b is further provided with an OSD (On Screen Display) 1051b for displaying characters on the LCD panel. The camera main frame 1b has a USB connector 130b. When a personal computer is connected via the USB connector 130b to the camera main frame 1b, the USB is driven by a USB driver 131b to transfer an image signal to the personal computer.

As mentioned above, according to the present embodiment of the invention, even if the camera head 1a and the camera main frame 1b are not formed in a unitary body, it is possible to implement a camera system capable of promptly performing the flash emission of the flash emission section at the side of the camera main frame in accordance with the photometric result at the side of the camera head according to the operation of the release button of the camera main frame.

Incidentally, according to the present embodiment, the TG 18a is connected via the dedicated line 1A to the flash control section 120b so that only the light emission start signal is promptly supplied from the TG 18a to the flash control section 120b. To let the integration circuit 16a perform the photometry, it is effective that the release signal SP1 according to the half-depression of the release button 13b is promptly transmitted from the camera main frame 1b to the head CPU 19a of the camera head 1a using another dedicated line. This feature makes it possible that the head CPU 19a promptly receives the release signal SP1 according to the half-depression of the release button 13b so that the integration circuit 16a performs the focusing control and the exposure control. An adoption of another dedicated line for transmitting the release signal makes it possible to more promptly perform the photometry processing while the release signal SP2 according to the full-depression is transmitted to the camera head 1a, so that the flash emission at the side of the camera main frame 1b is surely performed in timing according to the full-depression timing.

Figure 10:
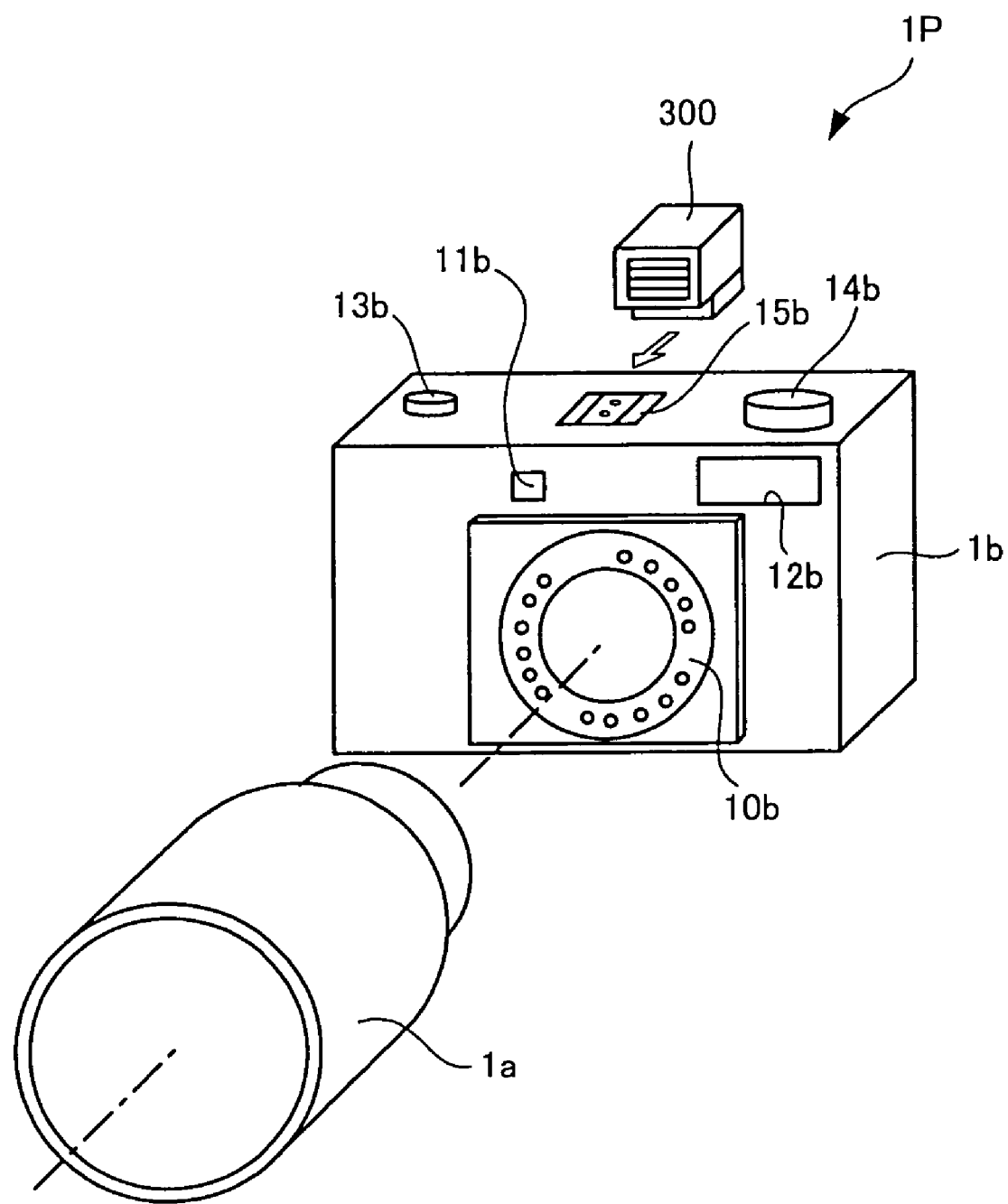
FIG. 10 is a perspective view of the camera system according to a sixth embodiment of the present invention.
Figure 11:
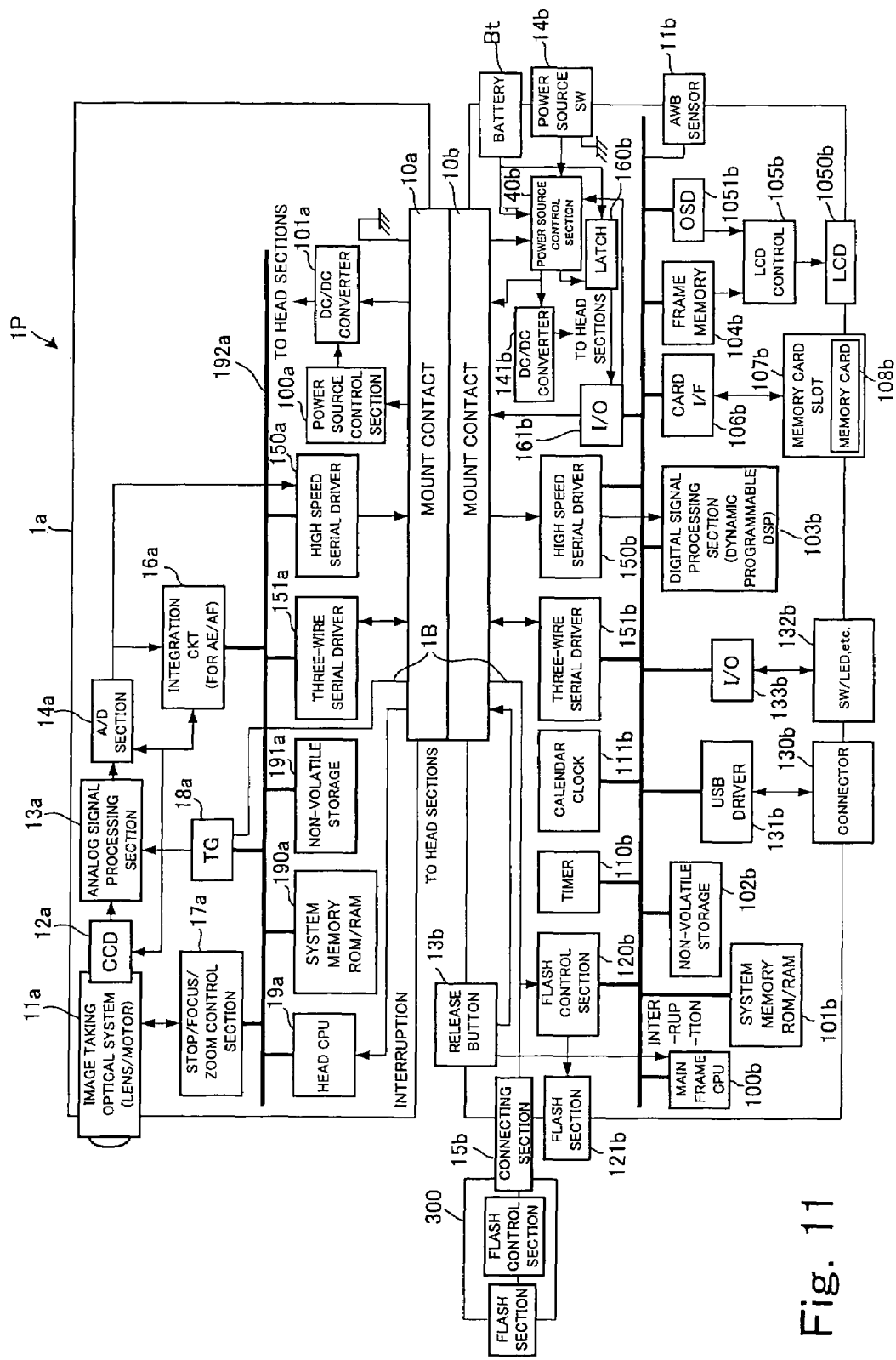
FIG. 11 is an internal structural view of the camera system of FIG. 10.

FIG. 10 is a perspective view of a camera system according to a sixth embodiment of the present invention. FIG. 11 is an internal structural view of the camera system of FIG. 10.

A camera system 1P shown in FIG. 1 is completely same in structure as that of FIG. 8 excepting that the camera main frame 1b is provided with an external flash connecting terminal 15b on which an external flash 300 is detachably mounted. Also with respect to the internal structure of the camera system as shown in FIG. 11, the internal structure of the camera system is completely same as that of FIG. 9 excepting that the external flash 300 is connected to the external flash connecting terminal 15b, and the light emission start signal is supplied from the TG 18a to the external flash 300 too.

This feature makes it possible to suitably control the timing of the flash emission even in the event that the external flash 300 is mounted.

Figure 12:
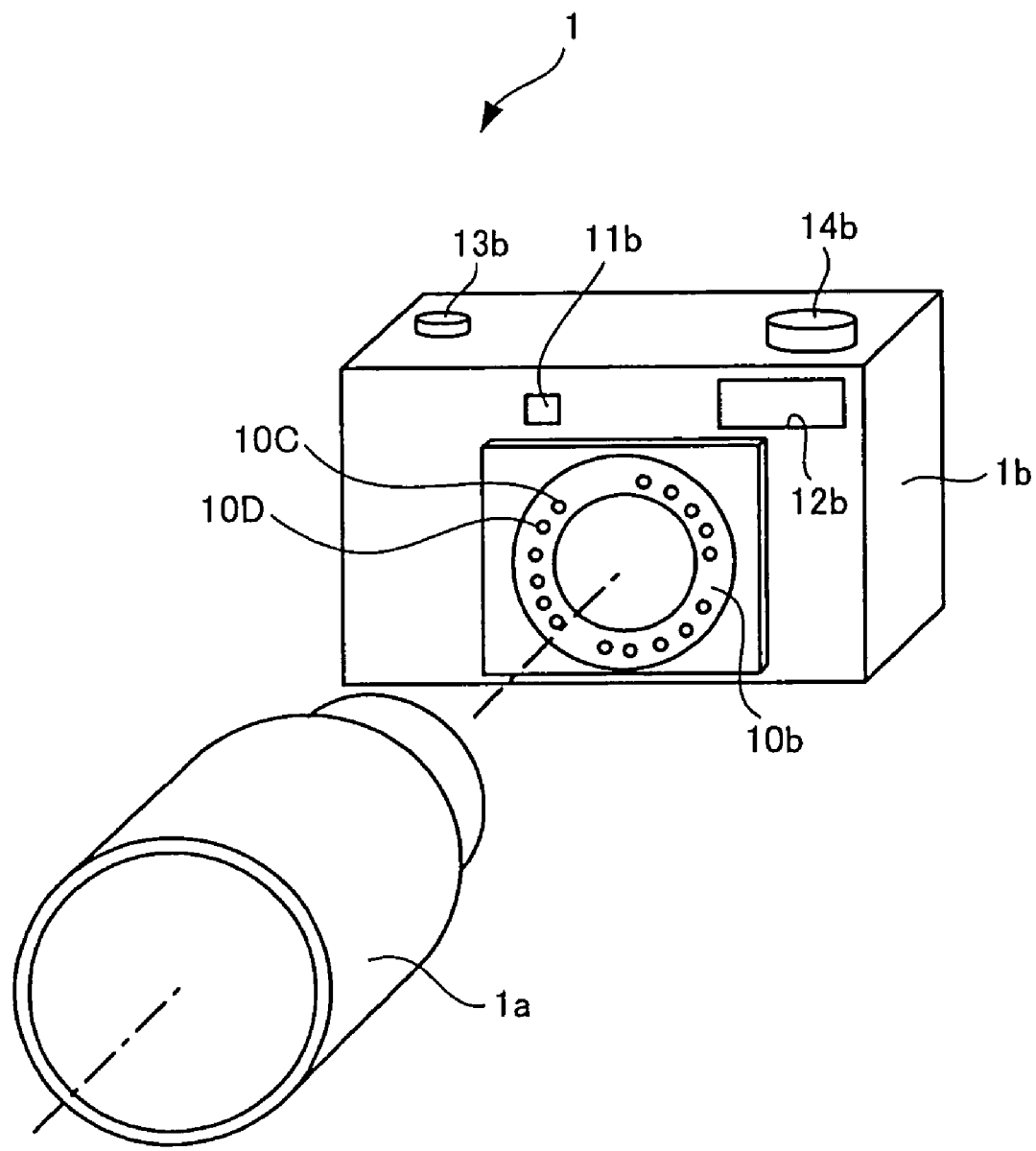
FIG. 12 is an exploded view of a camera system according to a seventh embodiment of the present invention.
Figure 13:
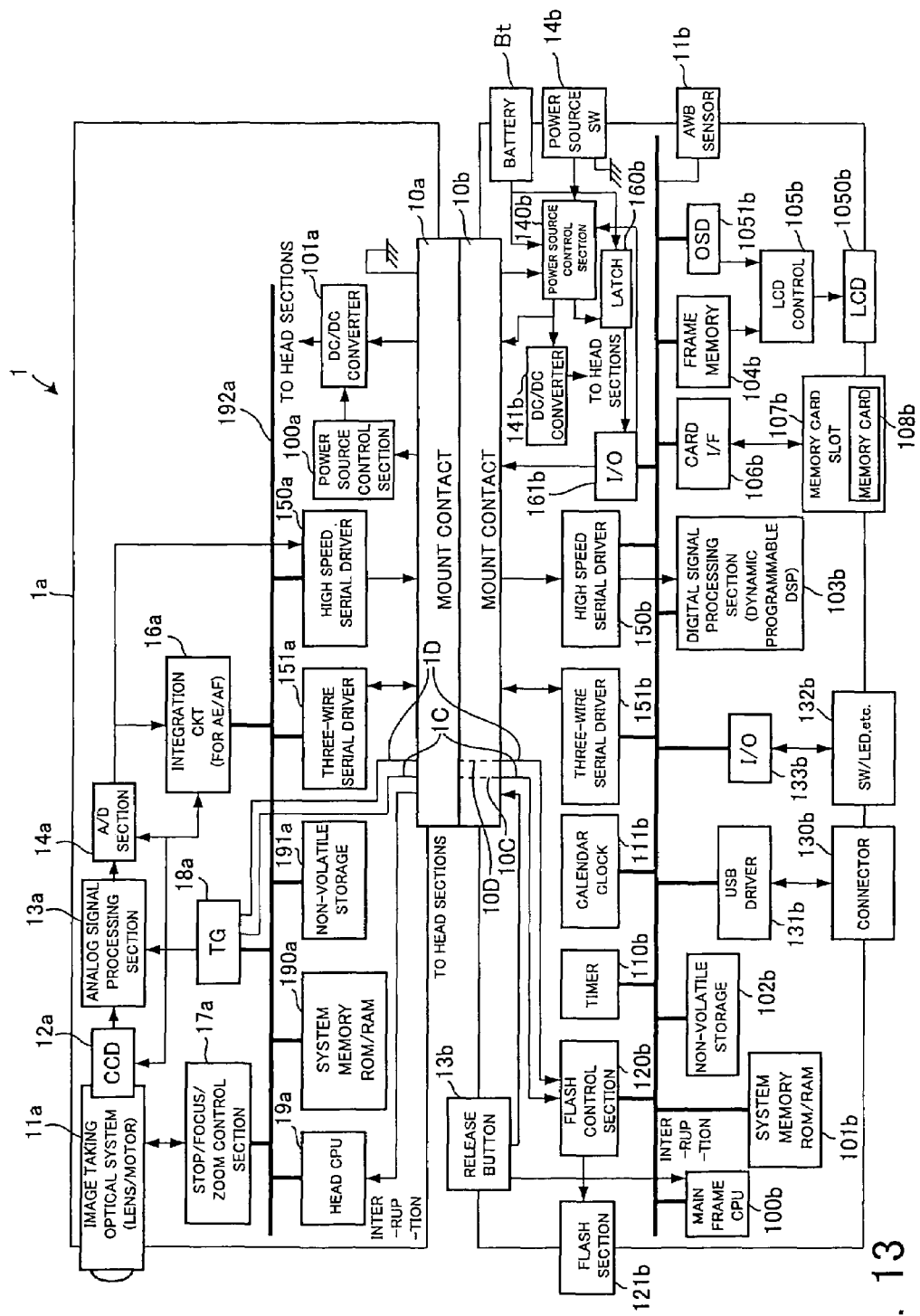
FIG. 13 is an exploded view of a camera system according to a seventh embodiment of the present invention.

FIG. 12 is an exploded view of a camera system according to a seventh embodiment of the present invention. FIG. 13 is an exploded view of a camera system according to a seventh embodiment of the present invention.

According to the fifth embodiment of the present invention, as shown in FIG. 9, only the light emission start signal is supplied from the TG 18a via the dedicated line to the flash control section 120b. On the other hand, according to the seventh embodiment of the present invention, both the light emission start signal and the light emission stop signal are supplied via two dedicated lines 1C and 1D, respectively. FIG. 12 shows mount contacts 10C and 10D to which the dedicated lines 1C and 1D are connected, respectively.

According to the camera system of the present embodiment, the TG 18a sets up the shutter speed to the CCD 12a. The CPU 19a causes the TG 18a to supply the exposure start signal to the CCD 12a, and also to supply the exposure stop signal to the CCD 12a after a predetermined time elapses. This feature is utilized to supply the light emission start signal and the light emission stop signal via two dedicated lines 1C and 1D to the flash control section 120b of the camera main frame 1b in synchronism with the timing of the supply of the light emission start signal and the light emission stop signal, respectively.

In this manner, there are provided two dedicated lines of the first dedicated line 1C for transmitting the light emission start signal and the second dedicated line 1D for transmitting the light emission stop signal so that the light emission time is strictly controlled. This feature makes it possible to apply the greater appropriate light quantity to the light receiving plane of the CCD 12a.

Figure 14:
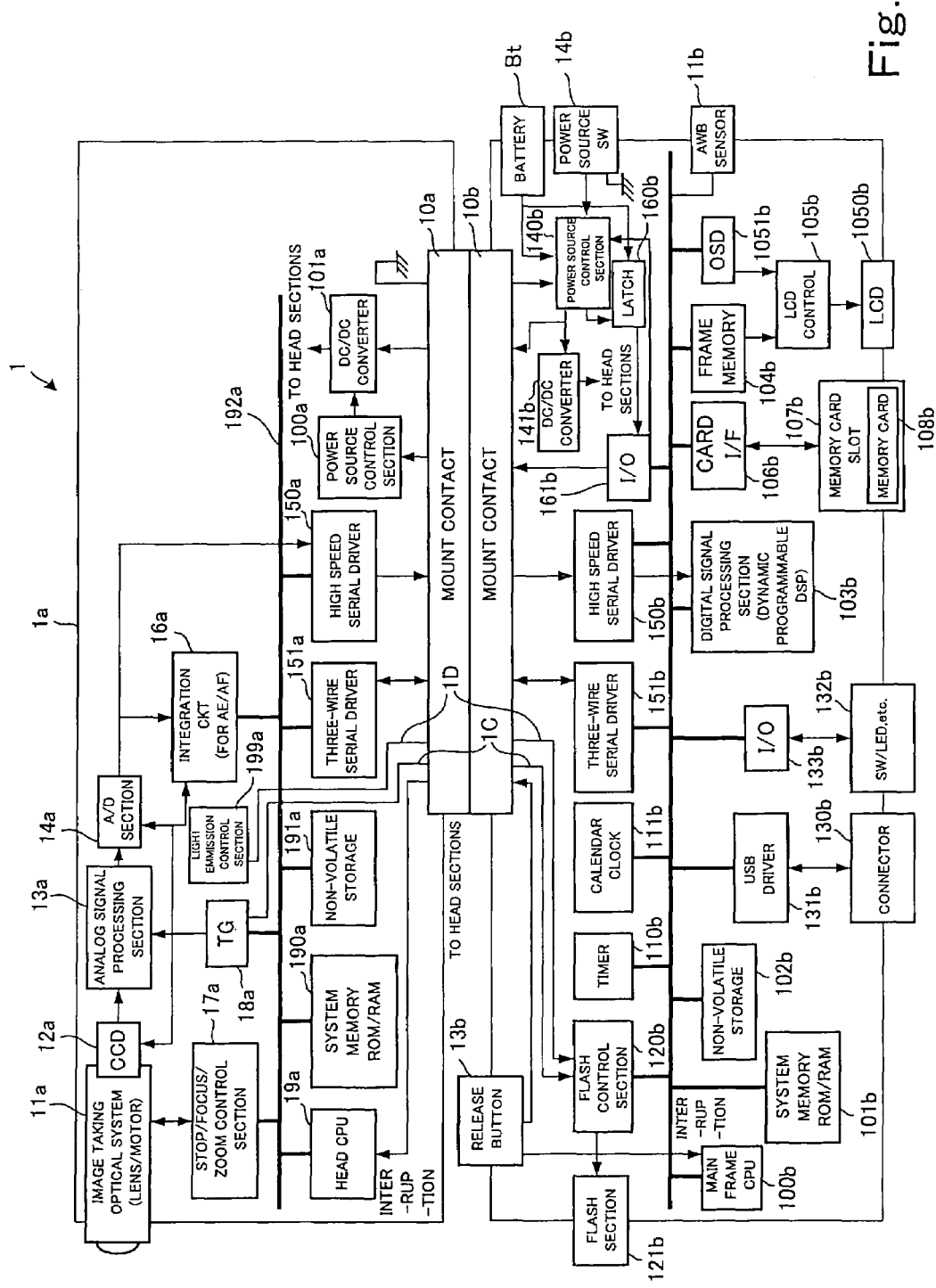
FIG. 14 is an exploded view of a camera system according to an eighth embodiment of the present invention.

FIG. 14 is an exploded view of a camera system according to an eighth embodiment of the present invention.

According to the first to third embodiments, for example, the light emission stop signal is determined through the arithmetic operation of the head CPU 19a, and the determined light emission stop signal is supplied to the flash control section 120b. On the other hand, according to the camera system of the eighth embodiment shown in FIG. 14, in order to more strictly control the light quantity, the camera head 1a is provided a light emission control section 199a to detect light quantity of flash actually emitted, so that the light emission stop signal is supplied via the dedicated line 1D to the flash control section 120b. When the light emission control section 199a accumulates the light quantity of flash emitted from the flash section 121b, it is possible to suitably supply the light emission stop signal via the dedicated line 1D to the flash control section 120b when the accumulated value reaches the light quantity to be applied to the light receiving plane of the CCD12a.

Figure 15:
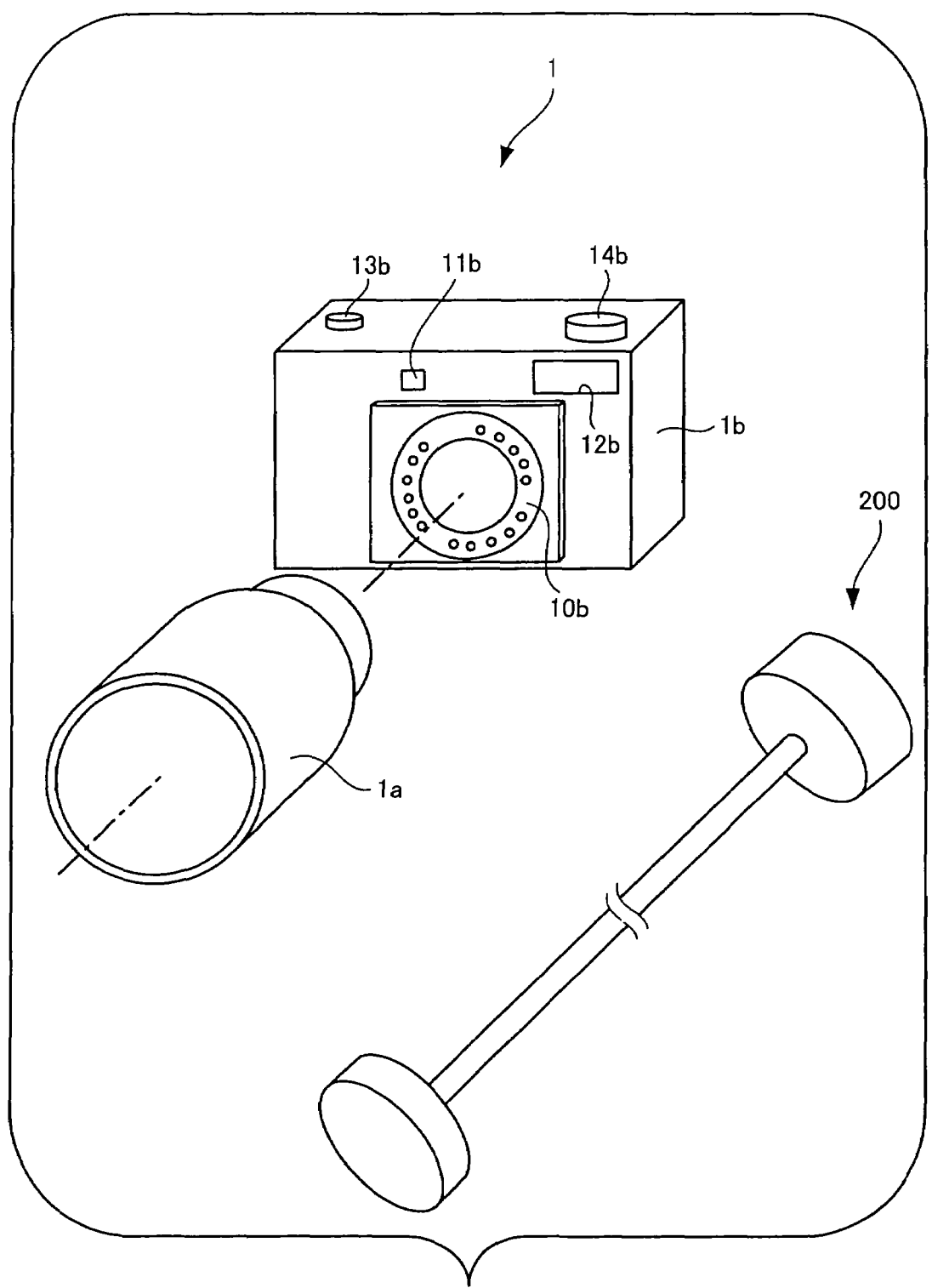
FIG. 15 is a perspective view of the camera system according to a ninth embodiment of the present invention.

FIG. 15 is a perspective view of the camera system according to a ninth embodiment of the present invention.

According to the fifth embodiment, there is disclosed a camera system where the camera head 1a is directly mounted on the camera main frame 1b to perform photography. However, it is acceptable, for example, that the camera head 1a is installed in the vicinity of a door for the purpose of a monitor, and the camera main frame 1b is disposed in a monitor unit.

When the camera head 1a is connected via a connection cable 200 shown in FIG. 15 to the camera main frame 1b, the camera system is utilized as a monitoring camera system.

As mentioned above, according to the present invention, it is possible to implement a camera system capable of exactly catching the subject at the time of release operation by the imaging device of the camera head in accordance with the release button operation at the side of the camera main frame, even if the camera head and the camera main frame are not formed in a unitary body.

Further, according to the present invention, even if the camera head and the camera main frame are not formed in a unitary body, it is possible to implement a camera system capable of promptly performing the flash emission of the flash emission section at the side of the camera main frame in accordance with the photometric result at the side of the camera head according to the operation of the release button of the camera main frame.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A camera system comprising: a camera head comprising an imaging optical system and an imaging device; and a camera main frame that receives an image signal from the camera head via an interface for transferring signals between the camera main frame and the camera head so as to perform signal processing,
wherein the camera head comprises a first CPU and a timing generator that supplies exposure start signal and exposure completion signal according to a shutter speed of an electronic shutter to the imaging device in accordance with a control of the first CPU,
the camera main frame comprises a second CPU and a release button for communicating a signal of a photography start to the second CPU, and
the camera system further comprises a dedicated line connecting the camera main frame with the camera head, the dedicated line supplying a release signal according to depression of the release button to the first CPU of the camera head when the release signal is supplied to the second CPU in accordance with the depression of the release button.

2. A camera system according to claim 1, wherein the release button has two operational modes of a half-depression mode for instructing a photography preparation and a full-depression mode for instructing a photography, and,
the camera main frame transmits a release signal according to a half-depression via the interface to the camera head, and transmits a release signal according to a full-depression via the dedicated line to the camera head.

3. A camera system according to claim 2, wherein when the camera head receives the release signal according to the frill-depression before a receipt of the release signal according to the half-depression, the camera system performs a photography preparation in accordance with a receipt of the release signal according to the full-depression to perform a subsequent photography.

4. A camera system according to claim 1, wherein the release button has two operational modes of a half-depression mode for instructing a photography preparation and a full-depression mode for instructing a photography, and, the camera main frame transmits both the release signal according to the half-depression and the release signal according to the full-depression via the dedicated line to the camera head on a mutually distinguishable basis.

5. A camera system comprising: a camera head comprising an imaging optical system and an imaging device; and a camera main frame that receives an image signal from the camera head via an interface for transferring signals between the camera main frame and the camera head so as to perform signal processing, wherein the camera head has a timing generator that supplies exposure start signal and exposure completion signal to the imaging device, the camera main frame has a flash emission section for emitting a flash in synchronism with photography, and the camera system further comprises a dedicated line connecting the camera main frame with the camera head, wherein a light emission instruction signal is supplied from the camera head via the dedicated line to the camera main frame so that the flash emission section emits a flash during an exposure by the imaging device.

6. A camera system according to claim 5, wherein the light emission instruction signal comprises a light emission start signal and a light emission stop signal, and the flash emission section starts a flash emission upon receipt of the light emission start signal and stops the flash emission upon receipt of the light emission stop signal, and the dedicated line comprises two dedicated lines of a first dedicated line for transmitting the light emission start signal and a second dedicated line for transmitting the light emission stop signal.

7. A camera system according to claim 5, wherein the light emission instruction signal comprises a light emission start signal and a light emission stop signal, and the flash emission section starts a flash emission upon receipt of the light emission start signal and stops the flash emission upon receipt of the light emission stop signal, and the dedicated line comprises a single dedicated line for transmitting both the light emission start signal and the light emission stop signal.

8. The camera system of claim 1, wherein the dedicated line connecting the camera main frame with the camera head further comprises a direct connection between the shutter release button and the first CPU of the camera head.

9. The camera system of claim 8, wherein the direct connection exclusively carries the release signal according to depression of the release button.

* * * * *